US011551595B2

(12) United States Patent
Yoon et al.

(10) Patent No.: US 11,551,595 B2
(45) Date of Patent: Jan. 10, 2023

(54) FOLDABLE MOBILE ELECTRONIC DEVICE CAPABLE OF SETTING BRIGHTNESS OF DISPLAY THROUGH LIGHT SENSOR

(71) Applicant: Samsung Electronics Co., Ltd., Suwon-si (KR)

(72) Inventors: Heewoong Yoon, Suwon-si (KR); Heejun Choi, Suwon-si (KR); Oheon Kwon, Suwon-si (KR); Jongah Kim, Suwon-si (KR); Kihyuk Lee, Suwon-si (KR); Donghan Lee, Suwon-si (KR); Jeongho Cho, Suwon-si (KR); Gwangho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 17/144,688

(22) Filed: Jan. 8, 2021

(65) Prior Publication Data

US 2021/0248942 A1    Aug. 12, 2021

(30) Foreign Application Priority Data

Feb. 10, 2020  (KR) ........................ 10-2020-0015397

(51) Int. Cl.
*G09G 3/00* (2006.01)
*G09G 5/10* (2006.01)
(Continued)

(52) U.S. Cl.
CPC .............. *G09G 3/035* (2020.08); *G01B 7/30* (2013.01); *G01C 19/00* (2013.01); *G01D 5/145* (2013.01);
(Continued)

(58) Field of Classification Search
CPC ........... G09G 3/035; G09G 3/20; G09G 5/10; G09G 2360/141; G09G 2360/144;
(Continued)

(56) References Cited

U.S. PATENT DOCUMENTS

2005/0168490 A1* 8/2005 Takahara ............. G09G 3/2014
345/690
2006/0081453 A1* 4/2006 Mitsuoka ............ H04M 1/0245
200/516
(Continued)

FOREIGN PATENT DOCUMENTS

JP      2010-122414 A    6/2010
JP      2013-007827 A    1/2013
(Continued)

OTHER PUBLICATIONS

International Search Report dated Apr. 12, 2021, issued in an International Application No. PCT/KR2021/000238.
(Continued)

*Primary Examiner* — Shaheda A Abdin
(74) *Attorney, Agent, or Firm* — Jefferson IP Law, LLP

(57) ABSTRACT

A foldable mobile electronic device is provided. The foldable mobile electronic device includes a processor configured to recognize, based on the data received from the first sensor, a change in a state of the foldable mobile electronic device from the folded state to a partially folded state before reaching an unfolded state, to identify a first illuminance by using the data received from the second sensor, based on the recognized state change, to set a first luminance corresponding to the first illuminance as a brightness of the display, to when an angle identified after the state change falls within a predetermined first angle range or when a specific time has not elapsed after the state change, perform a real-time adjustment operation on the brightness of the display, based on a second illuminance identified using the second sensor,
(Continued)

and to when the angle identified after the state change is outside the first angle range or when the specific time has elapsed after the state change, perform a hysteresis adjustment operation on the brightness of the display, based on the first illuminance.

20 Claims, 18 Drawing Sheets

(51) Int. Cl.
*G01D 5/14* (2006.01)
*G01P 13/00* (2006.01)
*G01P 15/00* (2006.01)
*G01C 19/00* (2013.01)
*G01J 1/42* (2006.01)
*G06F 1/16* (2006.01)
*G01B 7/30* (2006.01)

(52) U.S. Cl.
CPC ............ *G01J 1/4204* (2013.01); *G01P 13/00* (2013.01); *G01P 15/00* (2013.01); *G06F 1/1652* (2013.01); *G06F 1/1681* (2013.01); *G09G 5/10* (2013.01); *G09G 2320/0626* (2013.01); *G09G 2360/144* (2013.01); *G09G 2370/00* (2013.01)

(58) Field of Classification Search
CPC ........ G09G 2320/0626; G09G 2380/02; G09F 9/301; G01B 7/30; G01B 11/26; G06F 1/1626; G06F 1/1652; G06F 1/1677
See application file for complete search history.

(56) References Cited

U.S. PATENT DOCUMENTS

| | | | |
|---|---|---|---|
| 2011/0249042 A1 | 10/2011 | Yamamoto et al. | |
| 2014/0375702 A1* | 12/2014 | Cho | G06F 3/04886 |
| | | | 345/102 |
| 2015/0233162 A1 | 8/2015 | Lee et al. | |
| 2016/0012797 A1 | 1/2016 | Lee et al. | |
| 2016/0381014 A1 | 12/2016 | Kim | |
| 2017/0206049 A1 | 7/2017 | Choi et al. | |
| 2018/0054874 A1* | 2/2018 | Hunter | H04M 1/0279 |

FOREIGN PATENT DOCUMENTS

| | | |
|---|---|---|
| KR | 10-2007-0006334 A | 1/2007 |
| KR | 10-1875855 B1 | 7/2018 |

OTHER PUBLICATIONS

Extended European Search Report dated Jul. 7, 2022, issued in a counterpart European Application No. 21753106.0.

* cited by examiner

FOLDABLE MOBILE ELECTRONIC DEVICE CAPABLE OF SETTING BRIGHTNESS OF DISPLAY THROUGH LIGHT SENSOR

CROSS-REFERENCE TO RELATED APPLICATION(S)

This application is based on and claims priority under 35 U.S.C. 119(a) of a Korean patent application number 10-2020-0015397, filed on Feb. 10, 2020, in the Korean Intellectual Property Office, the disclosures of which is incorporated by reference herein in its entirety.

BACKGROUND

1. Field

The disclosure relates to a foldable mobile electronic device capable of setting a brightness of a display through a light sensor.

2. Description of Related Art

A mobile (or portable) electronic device may have a foldable housing that can be folded and unfolded about a folding axis. The foldable housing may be divided into two housings around the folding axis. The mobile electronic device may further have a flexible display, a first part of which is disposed in the first housing, and a second part of which is disposed in the second housing. When the mobile electronic device is in a folded state, the first and second parts of the display may face each other.

The mobile electronic device may measure an ambient illuminance using a light sensor (or referred to as an illuminance sensor) and, based on the measured illuminance, adjust a screen brightness of the display. For example, the mobile electronic device may set the display screen to be dark in a low-illuminance environment and also set the display screen to be bright in a high-illuminance environment, thus increasing visibility.

The mobile electronic device may set the brightness of the display to a specific luminance (e.g., a wake-up luminance) corresponding to an illuminance (e.g., a wake-up illuminance) obtained from the light sensor immediately before turning on the display. After turning on the display, the mobile electronic device may perform a hysteresis adjustment operation. For example, when the wake-up illuminance is 10 lux, a lower limit hysteresis and an upper limit hysteresis may be set to 1 lux and 81 lux, respectively. In this case, if the measured illuminance is 1 lux or less, the screen brightness may be set to a lower luminance than the wake-up luminance. If the measured illuminance is 81 lux or more, the screen brightness may be set to a higher luminance than the wake-up luminance.

The light sensor used to adjust the screen brightness may be disposed in the first housing (e.g., an upper housing) among two housings of the mobile electronic device. While the mobile electronic device is folded, the light sensor faces the second housing (e.g., a lower housing). As the mobile electronic device is gradually unfolded, the second housing may deviate from the field of view (FOV) of the light sensor.

The mobile electronic device may perform the hysteresis adjustment operation when changing a state from a folded state to an unfolded state. If the surroundings of the mobile electronic device are bright, a phenomenon that the display screen suddenly brightens in two operations may occur in the hysteresis adjustment operation. This may cause discomfort to user's eyes.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a mobile electronic device capable of preventing user's eye discomfort (e.g., eye fatigue or eyestrain due to a sudden brightening of a display screen) when changing a state of the device from a folded state to an unfolded state.

Additional aspects will be set forth in part in the description which follows and, in part, will be apparent from the description, or may be learned by practice of the presented embodiments.

In accordance with an aspect of the disclosure, a foldable mobile electronic device is provided. The foldable mobile electronic device includes a first housing, a second housing, a hinge assembly rotatably connecting the first housing and the second housing, a flexible display disposed in such a way so as to extend from one area of the first housing to one area of the second housing across the hinge assembly, a first sensor to generate data used to identify an angle formed between the first housing and the second housing, a second sensor to generate data used to identify an ambient illuminance around the foldable mobile electronic device, and disposed in the second housing to face the first housing when the foldable mobile electronic device is in a folded state, and a processor connected to the display, the first sensor, and the second sensor. The processor may be configured to recognize, based on the data received from the first sensor, a change in a state of the foldable mobile electronic device from the folded state to a partially folded state before reaching an unfolded state, to identify a first illuminance by using the data received from the second sensor, based on the recognized state change, to set a first luminance corresponding to the first illuminance as a brightness of the display, to when an angle identified after the state change falls within a predetermined first angle range or when a specific time has not elapsed after the state change, perform a real-time adjustment operation on the brightness of the display, based on a second illuminance identified using the second sensor, and to when the angle identified after the state change is outside the first angle range or when the specific time has elapsed after the state change, perform a hysteresis adjustment operation on the brightness of the display, based on the first illuminance.

In accordance with another aspect of the disclosure, a foldable mobile electronic device is provided. The foldable mobile electronic device includes a first housing, a second housing, a hinge assembly rotatably connecting the first housing and the second housing, a flexible display disposed in such a way so as to extend from one area of the first housing to one area of the second housing across the hinge assembly, a first sensor to generate data used to identify an angle formed between the first housing and the second housing, a second sensor to generate data used to identify an ambient illuminance around the foldable mobile electronic device, and disposed in the second housing to face the first housing when the foldable mobile electronic device is in a folded state, and a processor connected to the display, the first sensor, and the second sensor. The processor may be configured to recognize, based on the data received from the first sensor, a change in a state of the foldable mobile electronic device from the folded state to a partially folded state before reaching an unfolded state, to identify a first illuminance by using the data received from the second sensor, based on the recognized state change, to set a first luminance corresponding to the first illuminance as a brightness of the display, to while the foldable mobile electronic device is changed from the folded state to the unfolded state, perform a real-time adjustment operation on the brightness of the display, based on a second illuminance identified using the second sensor, and to when the angle identified after the state change falls within a predetermined angle range and is maintained for a specific time, perform a hysteresis adjustment operation on the brightness of the display, based on the first illuminance.

In accordance with another aspect of the disclosure, the mobile electronic device is provided. The electronic device includes adjusting the screen brightness in the order of the real-time adjustment operation and the hysteresis adjustment operation during the state change from the folded state to the unfolded state, thereby preventing a phenomenon that the screen brightness suddenly brightens by, and also reducing user's eye discomfort (e.g., eye fatigue or eyestrain due to a sudden brightening of the display screen).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
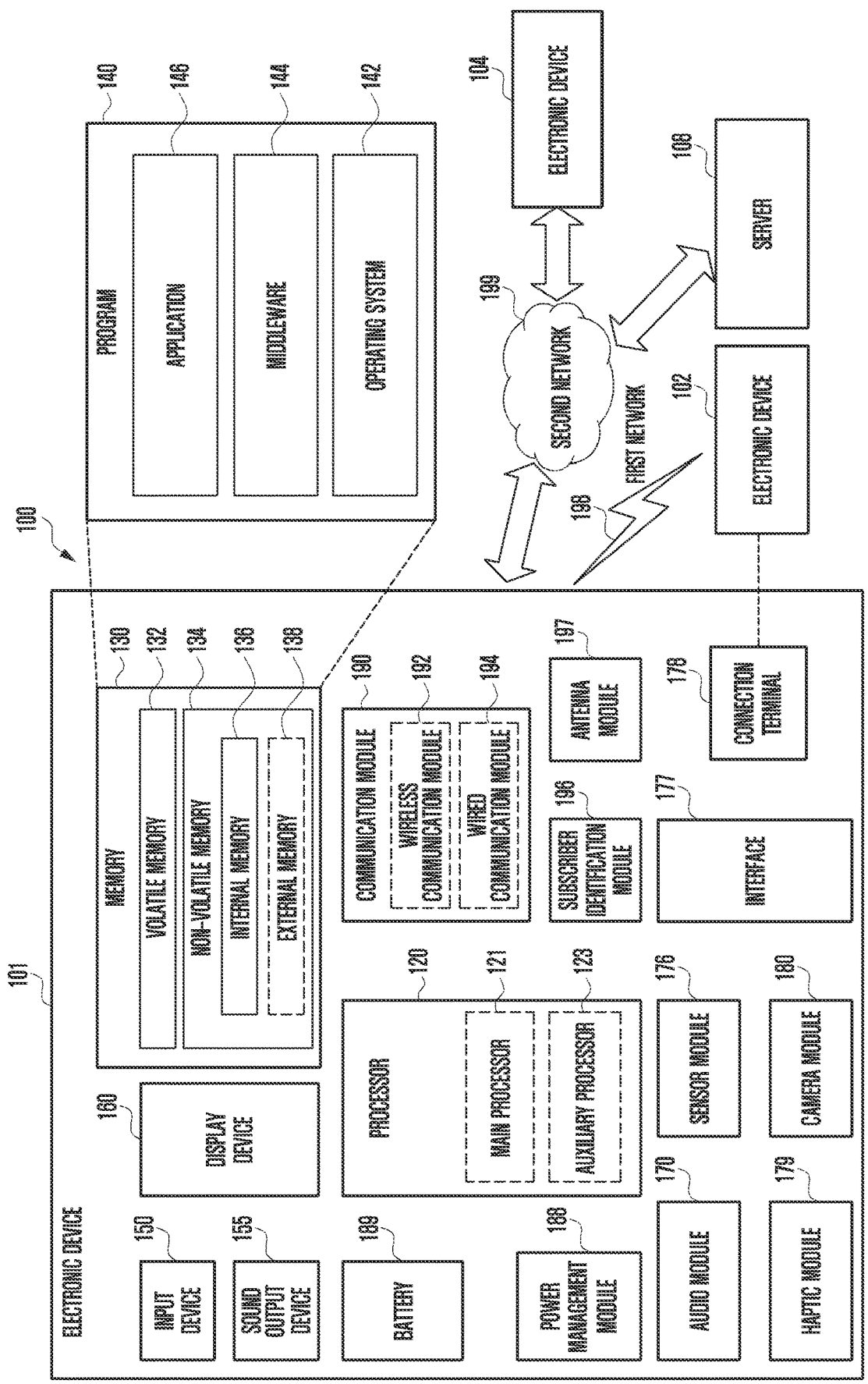
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., a neural processing unit) may include a hardware structure specialized for processing an artificial intelligence model. Artificial intelligence models can be created through machine learning. Such learning may be performed, for example, in the electronic device 101 itself on which artificial intelligence is performed, or may be performed through a separate server (for example, the server 108). The learning algorithm may include, for example, supervised learning, unsupervised learning, semi-supervised learning, or reinforcement learning, but is not limited the above-described example. The artificial intelligence model may include a plurality of artificial neural network layers. Artificial neural networks may include a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-networks, or a combination of two or more of the above, but is not limited to the above-described example. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, 5G network, next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network and a next-generation communication technology after a 4G network, for example, a new radio (NR) access technology. The NR access technology may support high-speed transmission of high-capacity data (enhanced mobile broadband (eMBB)), minimization of terminal power and connection of multiple terminals (massive machine type communications (eMTC)), or high reliability and low latency (ultra-reliable and low-latency (URLLC)). The wireless communication module 192 may support a high frequency band (e.g., mmWave band), for example, to achieve a high data rate. The wireless communication module 192 may support various technologies for securing performance in a high frequency band, for example, beam-forming, massive MIMO (multiple-input and multiple-output), FD-MIMO (full dimensional MIMO), array antennas, analog beam-forming, or large scale antennas. The wireless communication module 192 may support various requirements specified in the electronic device 101, an external electronic device (e.g., the electronic device 104), or a network system (e.g., the second network 199). According to an embodiment, the wireless communication module 192 may support a peak data rate for realizing eMBB (e.g., 20 Gbps or more), loss coverage for realizing mMTC (e.g., 164 dB or less), or U-plane latency for realizing URLLC (e.g., downlink (DL) and uplink (UL) each 0.5 ms or less, or round trip 1 ms or less).

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC that is disposed on or adjacent to a first side (e.g., a lower side) of the printed circuit board and capable of supporting a designated high frequency band (e.g., mmWave band), and a plurality of antennas (e.g., array antennas) that are disposed on or adjacent to the second side (e.g., top or side) of the printed circuit board and capable of transmitting or receiving a signal of the designated high frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, MEC (mobile edge computing), or client-server computing technology may be used, for example. The electronic device 101 may provide an ultra-low delay service using, for example, distributed computing or mobile edge computing. In another embodiment, the external electronic device 104 may include an Internet of Things (IoT) device. The server 108 may be an intelligent server using machine learning and/or neural networks. According to an embodiment, the external electronic device 104 or the server 108 may be included in the second network 199. The electronic device 101 may be applied to an intelligent service (e.g., smart home, smart city, smart car, or healthcare) based on 5G communication technology and IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Figure 2:
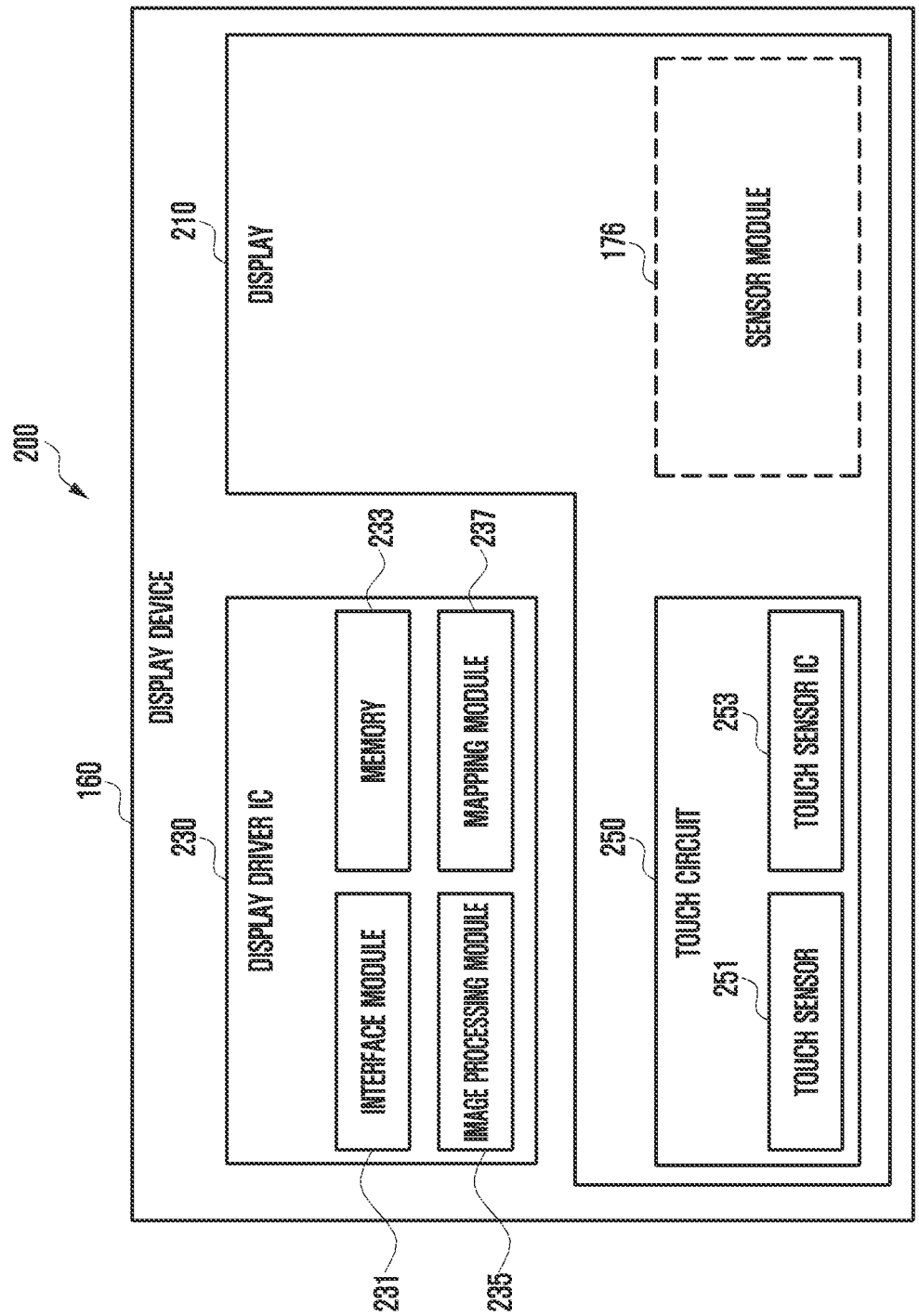
FIG. 2 is a block diagram illustrating a display device according to an embodiment of the disclosure.

FIG. 2 is a block diagram 200 illustrating the display device 160 according to an embodiment of the disclosure.

Referring to FIG. 2, the display device 160 may include a display panel 210 and a display driver integrated circuit (DDI) 230 to control the display panel 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform preprocessing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display panel 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display panel 210 may be driven, for example, based at least in part on the voltage value or the current value such that visual information (e.g., a text, an image, or an icon) corresponding to the image data may be displayed via the display panel 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display panel 210. To achieve this, for example, the touch sensor 251 may detect (e.g., measure) a change in a signal (e.g., a voltage, a quantity of light, a resistance, or a quantity of one or more electric charges) corresponding to the certain position on the display panel 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display panel 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display panel 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display panel 210. As another example, when the sensor module 176 embedded in the display device 160 includes a pressure sensor, the pressure sensor may obtain pressure information corresponding to a touch input received via a partial or whole area of the display panel 210. According to an embodiment, the touch sensor 251 or the sensor module 176 may be disposed between pixels in a pixel layer of the display panel 210, or over or under the pixel layer.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed on different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
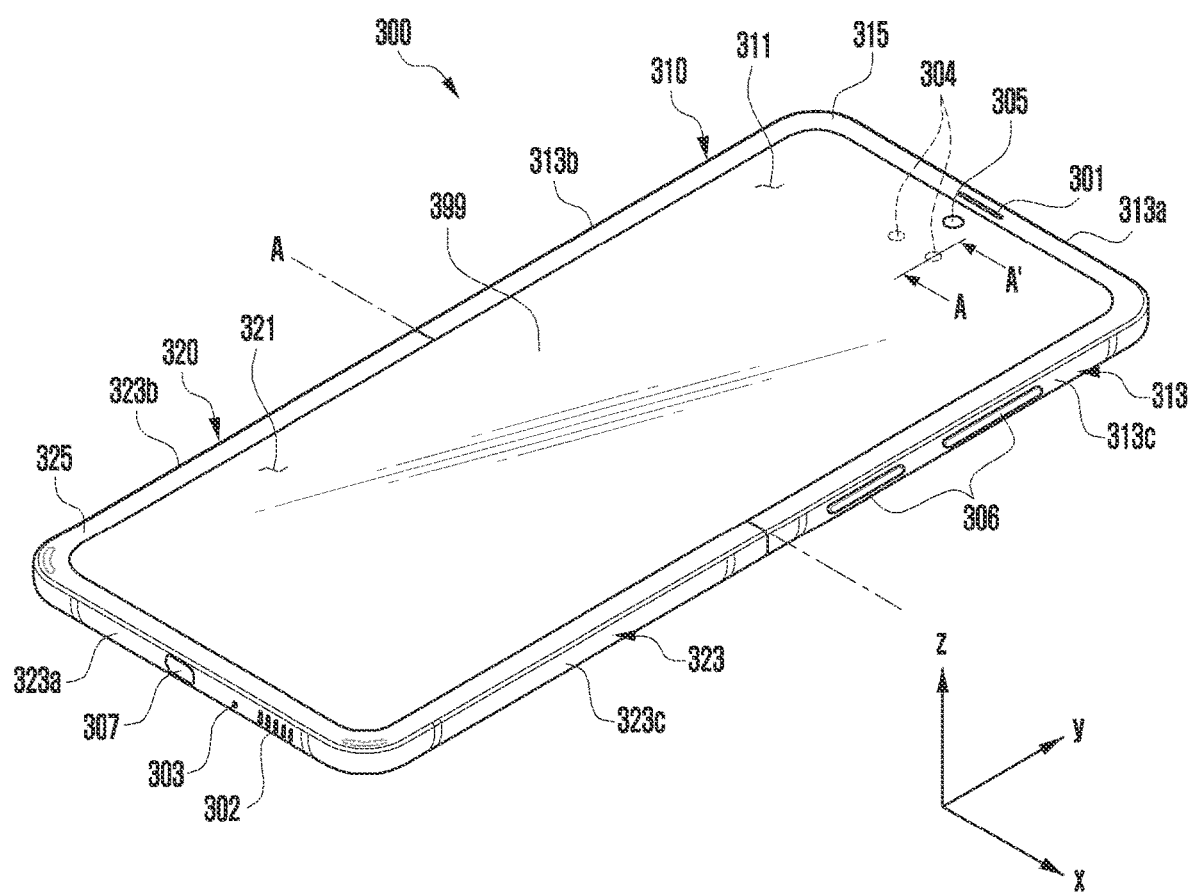
FIGS. 3A and 3B illustrate a front surface of a foldable mobile electronic device in an unfolded, flat, or open state according to various embodiments of the disclosure.
Figure 3B:
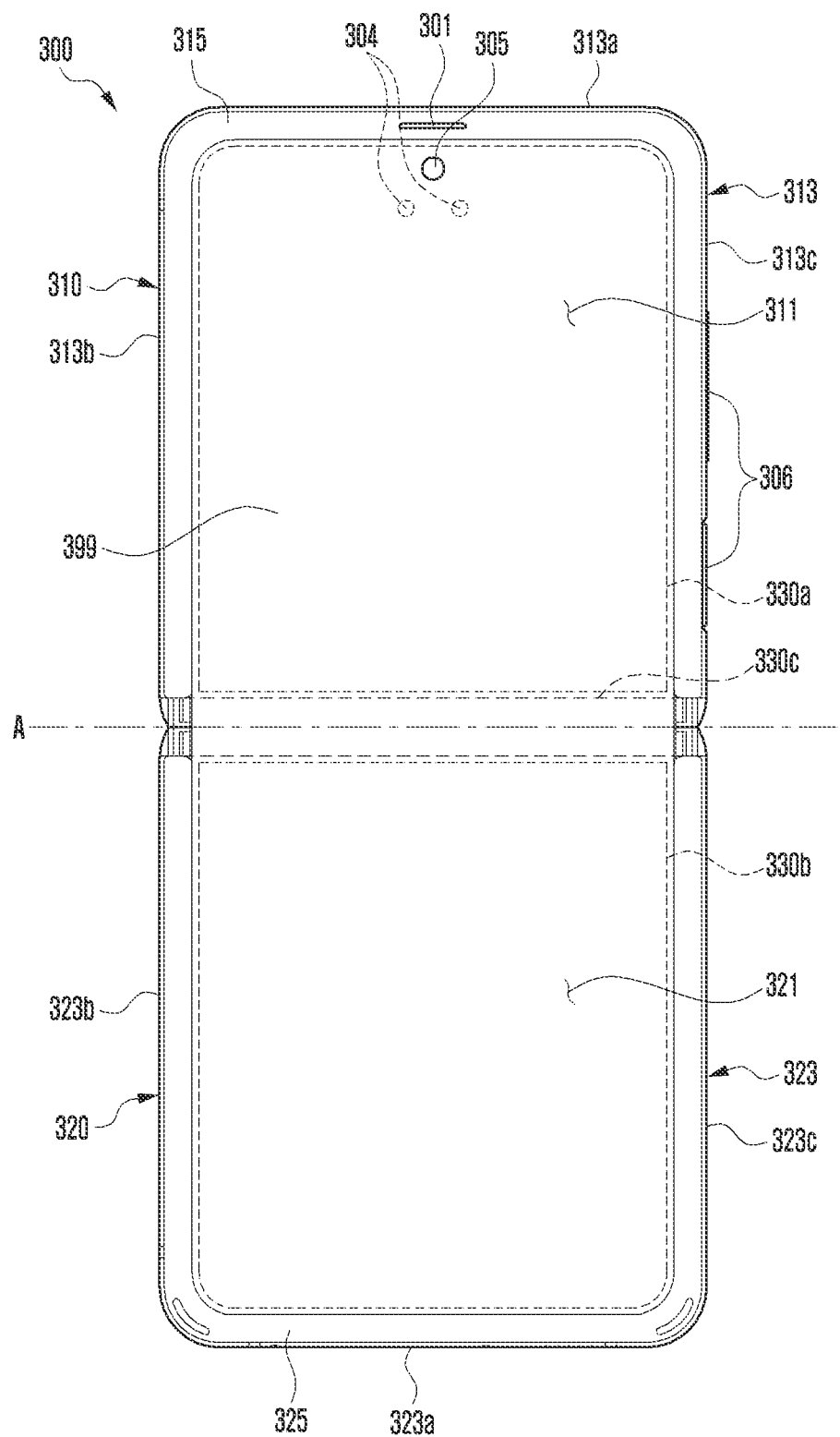

FIGS. 3A and 3B illustrate a front surface of a foldable mobile electronic device (hereinafter, simply referred to as an electronic device) in an unfolded, flat, or open state according to various embodiments of the disclosure.

Figure 3C:
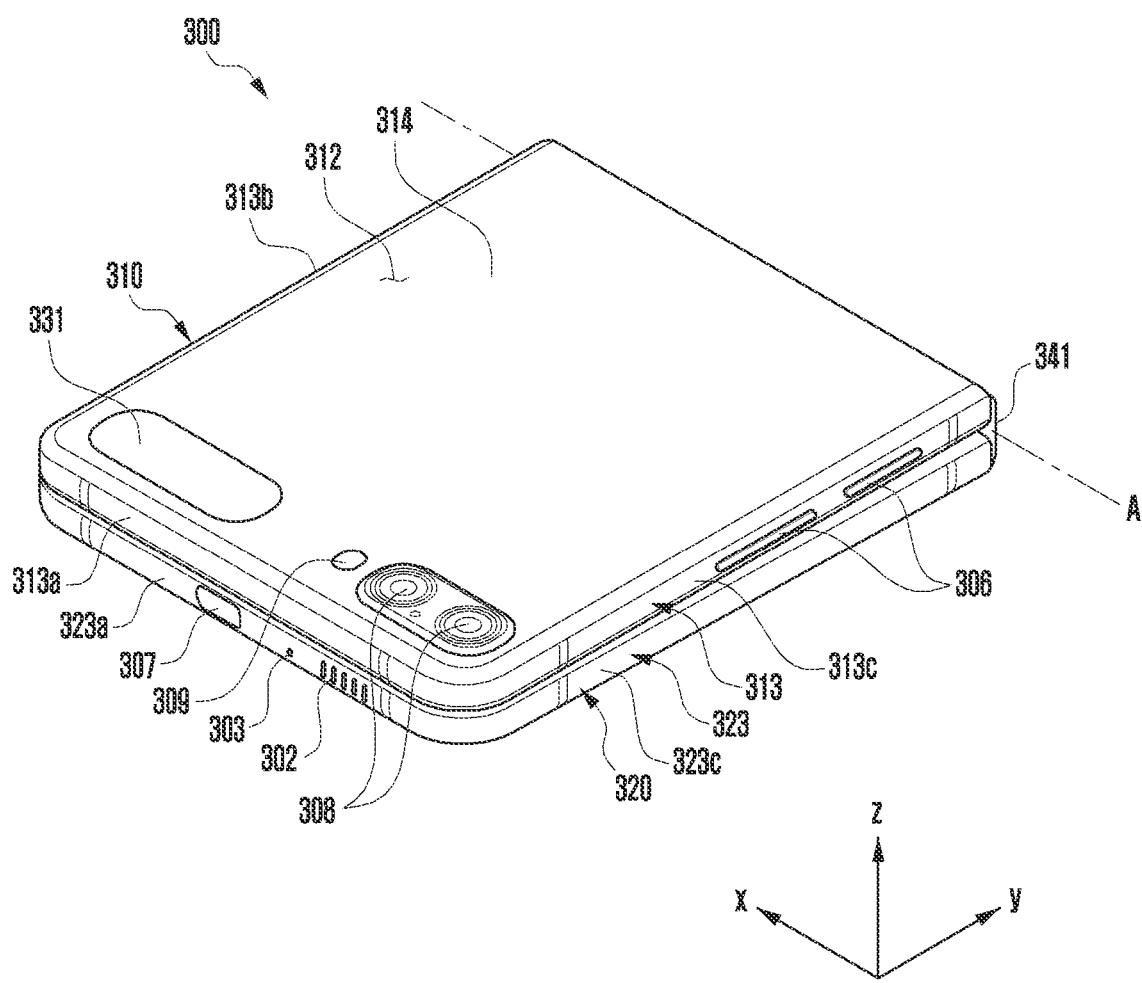
FIG. 3C illustrates a rear surface of the electronic device in a folded or closed state according to an embodiment of the disclosure.
Figure 3D:
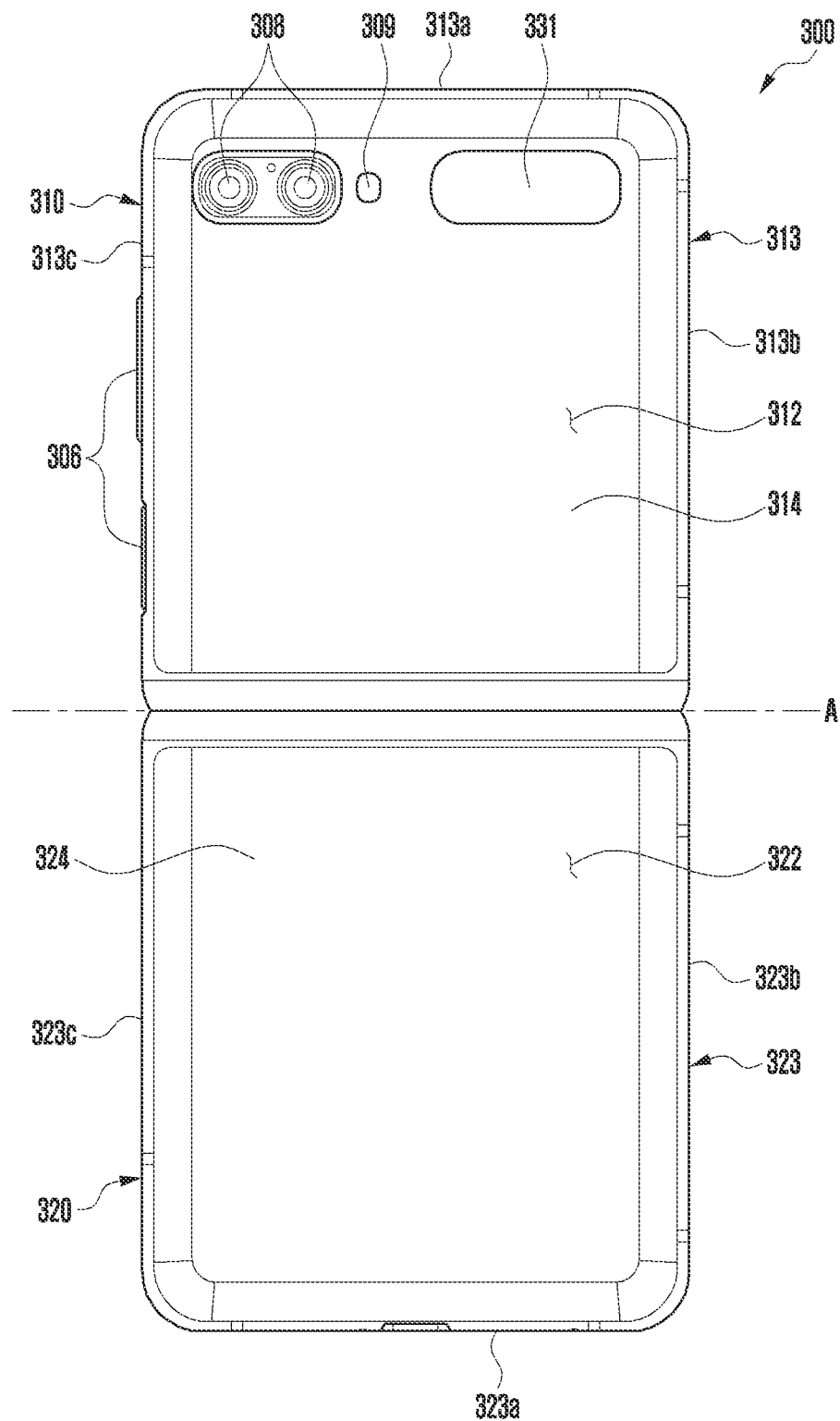
FIG. 3D illustrates the rear surface in the unfolded state according to an embodiment of the disclosure.

FIG. 3C illustrates a rear surface of the electronic device in a folded or closed state, and FIG. 3D illustrates the rear surface in the unfolded state according to various embodiment of the disclosure.

Figure 3E:
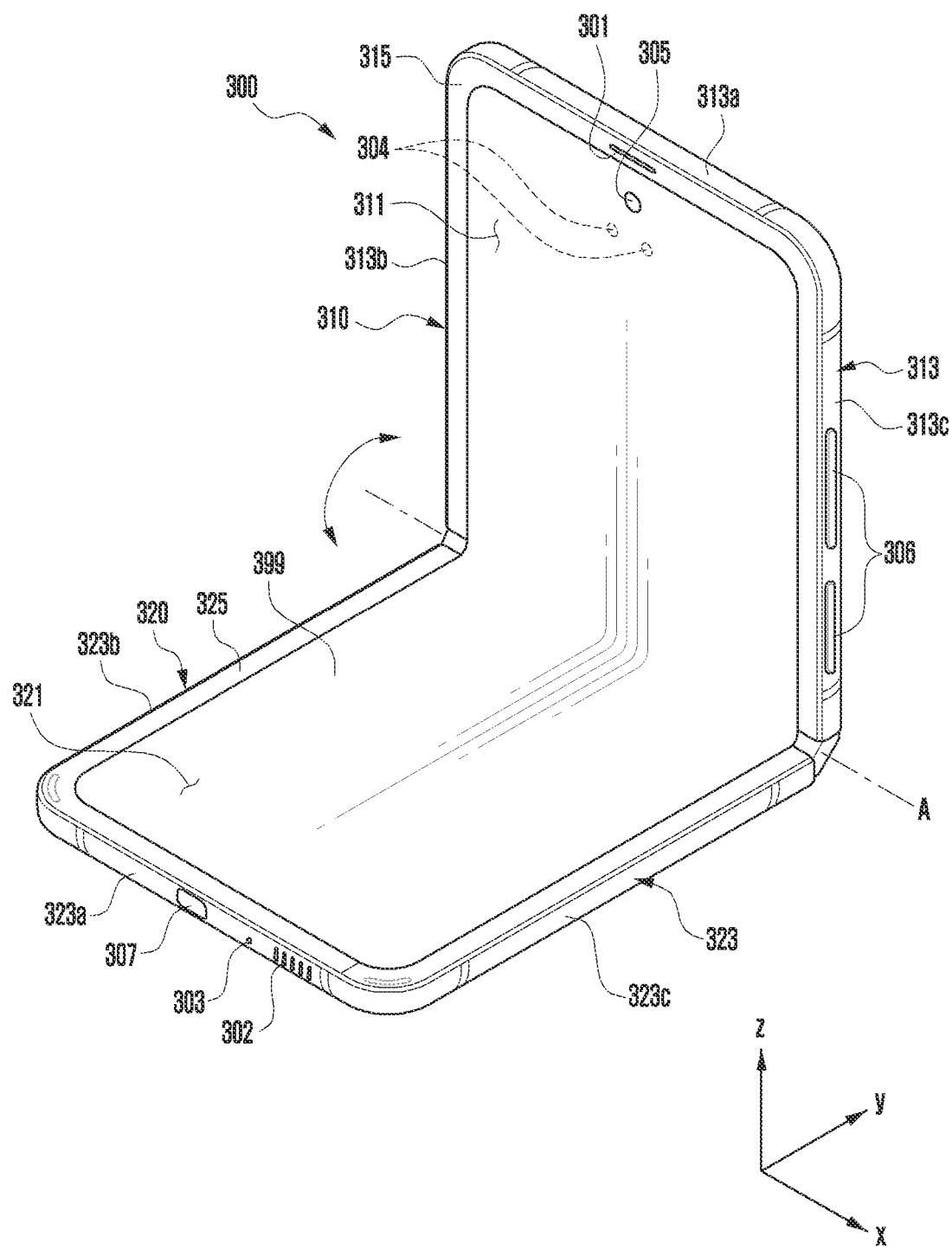
FIG. 3E illustrates the front surface in a partially folded state (i.e., a partially unfolded state, or an intermediate state between a fully folded state and a fully unfolded state) according to an embodiment of the disclosure.

FIG. 3E illustrates the front surface in a partially folded state (i.e., a partially unfolded state, or an intermediate state between a fully folded state and a fully unfolded state) according to an embodiment of the disclosure.

Figure 3F:
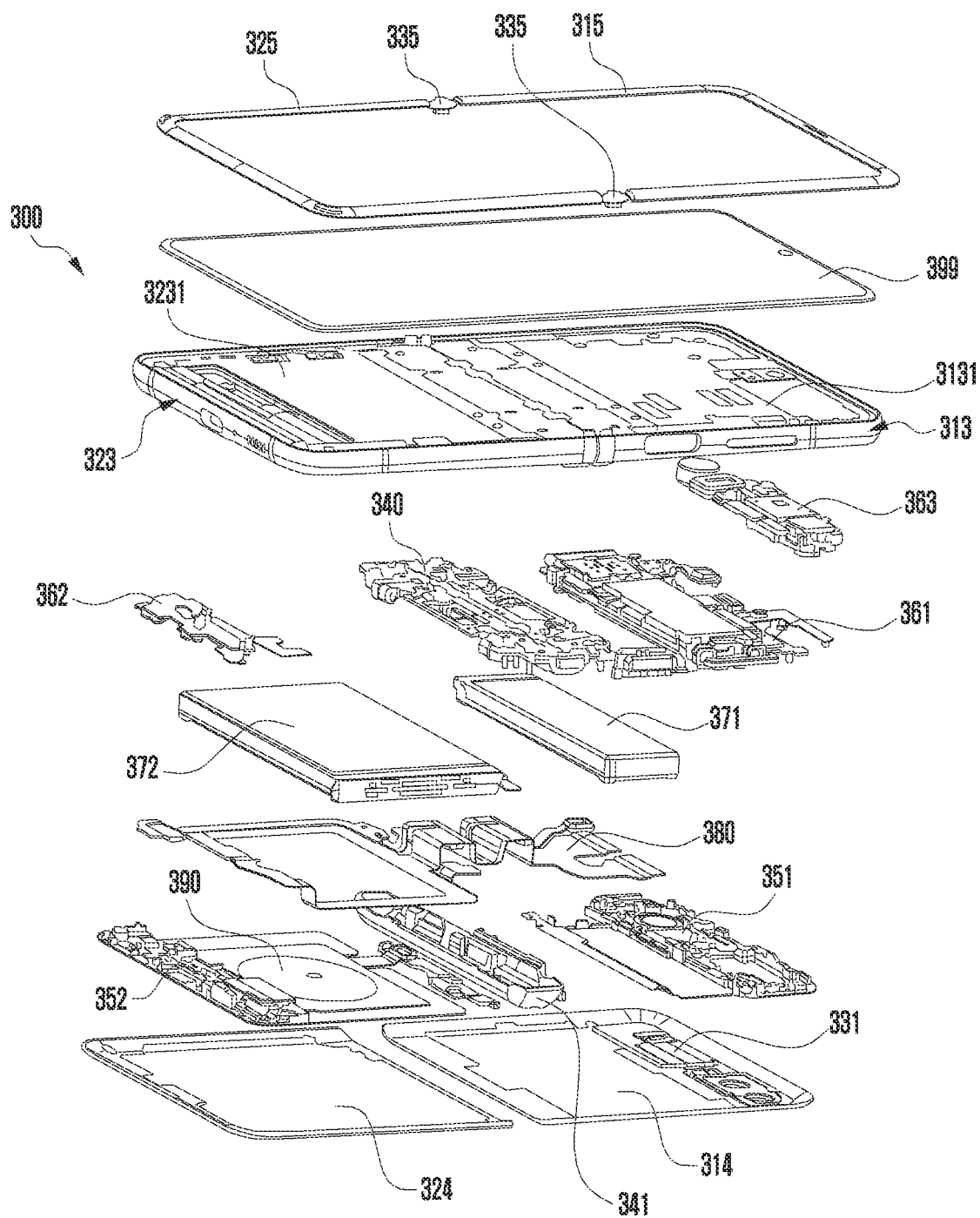
FIG. 3F is an exploded perspective view illustrating the electronic device according to an embodiment of the disclosure.
Figure 3G:
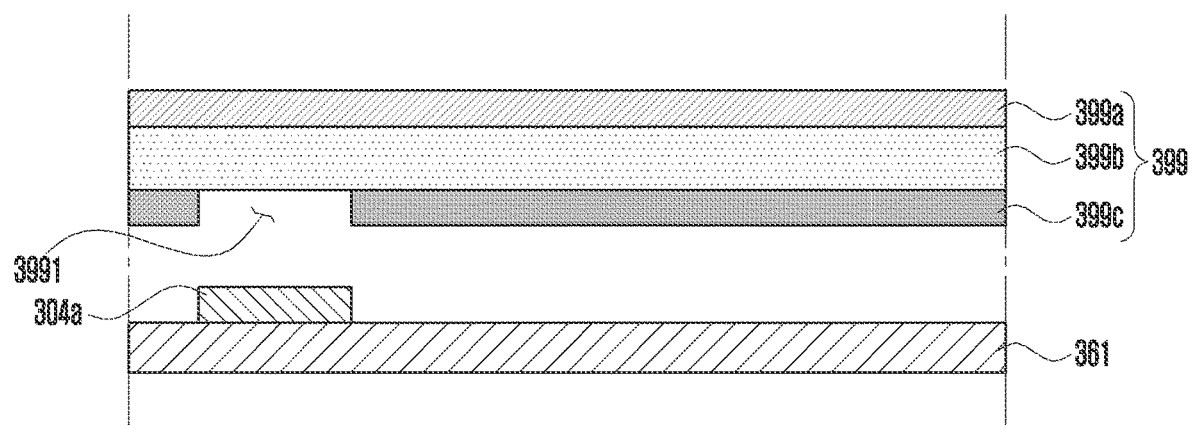
FIG. 3G is a cross-sectional view taken along the line A-A' in FIG. 3A according to an embodiment of the disclosure.

FIG. 3F is an exploded perspective view illustrating the electronic device, and FIG. 3G is a cross-sectional view taken along the line A-A' in FIG. 3A according to various embodiments of the disclosure.

Referring to FIGS. 3A to 3G, an electronic device 300 (e.g., the electronic device 101 in FIG. 1) according to various embodiments may include foldable housings 310 and 320, a hinge cover 341 covering a foldable portion of the foldable housings 310 and 320, and a flexible or foldable display 399 (hereinafter referred to as a display 399, e.g., the display device 160 in FIGS. 1 and 2) disposed in a space formed by the foldable housings 310 and 320. In the disclosure, a surface on which the display 399 is disposed is defined as a front surface of the electronic device 300. In addition, a surface opposite to the front surface is defined as a rear surface of the electronic device 300. Also, a surface laterally surrounding the space between the front and rear surfaces is defined as a lateral surface of the electronic device 300.

According to various embodiments, the electronic device 300 may include a pair of housings 310 and 320 (i.e., foldable housings) that are rotatably combined with each other and are foldable to face each other with respect to a hinge module 340 (or a hinge assembly). According to an embodiment, the electronic device 300 may include the display 399 disposed in an area formed by the pair of housings 310 and 320. According to an embodiment, the first housing 310 and the second housing 320 are disposed on both sides around a folding axis (shown as an axis A), and may have a shape that is generally symmetric with respect to the folding axis. According to an embodiment, an angle or distance between the first housing 310 and the second housing 320 may vary depending on whether the electronic device 300 is in the unfolded state, the folded state, or the intermediate state.

According to various embodiments, the pair of housings 310 and 320 may include the first housing 310 connected to the hinge module 340, and the second housing 320 connected to the hinge module 340. According to an embodiment, the first housing 310 may have a first surface 311 facing a first direction (e.g., a front direction, i.e., the z-axis direction) in the unfolded state, and a second surface 312 opposite to the first surface 311 and facing a second direction (e.g., a rear direction, i.e., the negative z-axis direction) in the unfolded state. According to an embodiment, the second housing 320 may have a third surface 321 facing the first direction in the unfolded state, and a fourth surface 322 opposite to the third surface 321 and facing the second direction in the unfolded state. According to an embodiment, the first surface 311 of the first housing 310 and the third surface 321 of the second housing 320 are directed to the same first direction in the unfolded state, and face each other in the folded state. According to an embodiment, the second surface 312 of the first housing 310 and the fourth surface 322 of the second housing 320 are directed to the same second direction in the unfolded state, and face opposite directions in the folded state.

According to various embodiments, the first housing 310 may include a first lateral frame 313 forming at least partially the lateral surface of the electronic device 300, and a first rear cover 314 combined with the first lateral frame 313 and forming at least a part of the second surface 312 of the electronic device 300. According to an embodiment, the first lateral frame 313 may have a first lateral portion 313a, a second lateral portion 313b extended from one end of the first lateral portion 313a, and a third lateral portion 313c extended from the other end of the first lateral portion 313a. According to an embodiment, the first, second, and third lateral portions 313a, 313b, and 313c of the first lateral frame 313 may form three sides of a quadrangle (e.g., square or rectangle).

According to various embodiments, the second housing 320 may include a second lateral frame 323 forming at least partially the lateral surface of the electronic device 300, and a second rear cover 324 combined with the second lateral frame 323 and forming at least a part of the fourth surface 322 of the electronic device 300. According to an embodiment, the second lateral frame 323 may have a fourth lateral portion 323a, a fifth lateral portion 323b extended from one end of the fourth lateral portion 323a, and a sixth lateral portion 323c extended from the other end of the fourth lateral portion 323a. According to an embodiment, the fourth, fifth, and sixth lateral portions 323a, 323b, and 323c of the second lateral frame 323 may form three sides of a quadrangle (e.g., square or rectangle).

According to various embodiments, the pair of housings 310 and 320 is not limited to illustrated shape, structure, and configuration, and may be implemented through any other shape, structure, and configuration. For example, the first lateral frame 313 may be integrally formed with the first rear cover 314, and the second lateral frame 323 may be integrally formed with the second rear cover 324.

According to various embodiments, the first rear cover 314 and the second rear cover 324 may be formed of coated or colored glass, ceramic, polymer, metal (e.g., aluminum, stainless steel (STS), or magnesium), or any combination thereof.

According to various embodiments, the display 399 may be disposed to extend from the first surface 311 of the first housing 310 to at least a part of the third surface 321 of the second housing 320 across the hinge module 340. Referring to FIG. 3B, the display 399 may include a first flat portion 330a substantially corresponding to the first surface 311, a second flat portion 330b substantially corresponding to the second surface 312, and a bendable portion 330c connecting the first flat portion 330a and the second flat portion 330b and corresponding to the hinge module 340. According to an embodiment, the electronic device 300 may include a first protective cover 315 (e.g., a first protective frame or a first decorative member) combined with an edge of the first housing 310, and may also include a second protective cover 325 (e.g., a second protective frame or a second decorative member) combined with an edge of the second housing 320. According to an embodiment, the first protective cover 315 and the second protective cover 325 may be formed of a metal or polymer material. According to an embodiment, the display 399 may be positioned such that an edge of the first flat portion 330a is interposed between the first housing 310 and the first protective cover 315. Similarly, the display 399 may also be positioned such that an edge of the second flat portion 330b is interposed between the second housing 320 and the second protective cover 325. In addition, the display 399 may be positioned such that a protective cap 335 disposed in a region corresponding to the hinge module 340 protects a corresponding edge of the display 399. Therefore, substantially all edges of the display 399 may be protected from the outside.

According to various embodiments, the electronic device 300 may further include a sub-display 331 disposed separately from the display 399. According to an embodiment, the sub-display 331 may be disposed to be exposed at least partially on the second surface 312 of the first housing 310. Thus, in the folded state, the sub-display 331 may display status information of the electronic device 300 by replacing a display function of the display 399. According to an embodiment, the sub-display 331 may be disposed to be visible from the outside through at least a portion of the first rear cover 314. In some embodiments, the sub-display 331 may be disposed on the fourth surface 322 of the second housing 320. In this case, the sub-display 331 may be disposed to be visible from the outside through at least a portion of the second rear cover 324.

According to various embodiments, the electronic device 300 may further include at least one of an input device 303, audio output devices 301 and 302, a sensor module 304, camera modules 305 and 308, a flashlight 309, a key input device 306, or a connector port 307. In an embodiment, when viewed from above the front surface of the electronic device, the sensor module 304 (e.g., the sensor module 176 in FIG. 1) and the camera module 305 may be disposed under the display 399.

Referring to FIG. 3E, the electronic device 300 according to various embodiments may operate to maintain the intermediate state through the hinge module 340. In this case, the electronic device 300 may control the display 399 to respectively display different contents in a display area corresponding to the first surface 311 and another display area corresponding to the third surface 321. According to an embodiment, at a specific angle (e.g., an angle between the first and second housings 310 and 320 in the intermediate state), the electronic device 300 may operate continuously between the unfolded state and the folded state through the hinge module 340. For example, when a slight pressing force is applied in an opening direction in a state partially unfolded at the specific angle, the electronic device 300 may continuously operate to enter the fully unfolded state through the hinge module 340. In addition, when a slight pressing force is applied in a closing direction in a state partially unfolded at the specific angle, the electronic device 300 may continuously operate to enter the fully folded state through the hinge module 340. In some embodiments, the electronic device 300 may operate to maintain the partially unfolded state at various angles through the hinge module 340.

Referring to FIG. 3F, the electronic device 300 according to various embodiments may include the first lateral frame 313, the second lateral frame 323, and the hinge module 340 rotatably connecting the first lateral frame 313 and the second lateral frame 323. According to an embodiment, the electronic device 300 may further include a first support plate 3131 extended at least partially from the first lateral frame 313, and a second support plate 3231 extended at least partially from the second lateral frame 323. According to an embodiment, the first support plate 3131 may be integrally formed with or structurally combined with the first lateral frame 313. Similarly, the second support plate 3231 may be integrally formed with or structurally combined with the second lateral frame 323. According to an embodiment, the electronic device 300 may include the display 399 disposed to be supported by the first and second support plates 3131 and 3231. According to an embodiment, the electronic device 300 may include the first rear cover 314 combined with the first lateral frame 313, and the second rear cover 324 combined with the second lateral frame 323. A first space is formed between the first rear cover 314 and the first support plate 3131, and a second space is formed between the second rear cover 324 and the second support plate 3231. In some embodiments, the first lateral frame 313 and the first rear cover 314 may be formed integrally, and the second lateral frame 323 and the second rear cover 324 may be formed integrally. According to an embodiment, the electronic device 300 may include the first housing 310 provided through the first lateral frame 313, the first support plate 3131, and the first rear cover 314. Similarly, the electronic device 300 may include the second housing 320 provided through the second lateral frame 323, the second support plate 3231, and the second rear cover 324.

According to various embodiments, the electronic device 300 may further include a first substrate assembly 361 (e.g., a main printed circuit board), a camera assembly 363, a first battery 371, and/or a first bracket 351, which are disposed in the first space between the first support plate 3131 of the first lateral frame 313 and the first rear cover 314. According to an embodiment, the camera assembly 363 may include a plurality of cameras (e.g., the camera modules 305 and 308 in FIGS. 3A and 3C), and may be electrically connected to the first substrate assembly 361. According to an embodiment, the first bracket 351 may provide a support structure and improved rigidity for supporting the first substrate assembly 361 and/or the camera assembly 363. According to an embodiment, the electronic device 300 may further include a second substrate assembly 362 (e.g., a sub printed circuit board), an antenna 390 (e.g., a coil member), a second battery 372, and/or a second bracket 352, which are disposed in the second space between the second support plate 3231 of the second lateral frame 323 and the second rear cover 324. According to an embodiment, the electronic device 300 may also include a wiring member 380 (e.g., a flexible circuit board (FPCB)). The wiring member 380 may be electrically connected to the first substrate assembly 361, disposed to cross the hinge module 340, and be extended and electrically connected to a plurality of electronic components (e.g., the second substrate assembly 362, the second battery 372, and/or the antenna 390) disposed in the second space.

According to various embodiments, the electronic device 300 may further include a hinge cover 341 supporting the hinge module 340. The hinge cover 341 may be exposed to the outside in the folded state, and be placed into the first and second spaces so as not to be visible to the outside in the unfolded state.

According to various embodiments, the electronic device 300 may include the first protective cover 315 disposed along and combined with the first lateral frame 313, and also include the second protective cover 325 disposed along and combined with the second lateral frame 323. According to an embodiment, in the display 399, the edge of the first flat portion (e.g., the first flat portion 330a in FIG. 3B) may be protected by the first protective cover 315, and the edge of the second flat portion (e.g., the second flat portion 330b in FIG. 3B) may be protected by the second protective cover 325. According to an embodiment, the electronic device 300 may also include the protection cap 335 disposed to protect the edge of the bendable portion (e.g., the bendable portion 330c in FIG. 3B) of the display 399 corresponding to the hinge module 340.

Referring to FIG. 3G, the display 399 according to various embodiments may include a first protective cover 399a, a display panel 399b (e.g., the display panel 210 in FIG. 2), and a second protective cover 399c. The first protective cover 399a is attached to a front surface of the display panel 399b and may be formed of a flexible and transparent material (e.g., colorless polyimide (CPI)). The second protective cover 399c is attached to a rear surface of the display panel 399b and may include a metal layer (e.g., a copper sheet) and/or a light blocking layer (e.g., a black embossing layer). A light sensor 304a (e.g., an ambient light sensor (ALS)) is positioned under the second protective cover 399c and may be mounted on the first substrate assembly 361. An opening 3991 may be formed in at least a part of the second protective cover 399c disposed above the light sensor 304a in order to allow the light sensor 304a to detect external light. The opening 391 may be formed in a position and/or size corresponding to the field of view (FOV) of the light sensor 304a.

In an embodiment, when the electronic device 300 is in the unfolded state (e.g., the state shown in FIG. 3A), the first housing 310 and the second housing 310 may be disposed to form an angle of about 180 degrees and face the same direction. For example, a first area (e.g., the first surface 311) and a second area (e.g., the third surface 321) of the display 399 may form 180 degrees and be directed to the same direction (e.g., the front direction of the electronic device).

In an embodiment, when the electronic device 300 is in the folded state (e.g., the state shown in FIG. 3C), the first housing 310 and the second housing 320 may be disposed to face each other. For example, the first area and the second area of the display 399 may form a small angle (e.g., between about 0 degree and 10 degrees) and may face each other.

In an embodiment, when the electronic device 300 is in the intermediate state (e.g., the state shown in FIG. 3E), the first housing 310 and the second housing 320 may be disposed at a certain angle therebetween. For example, the first area and the second area of the display 399 may form a certain angle that is greater than that in the folded state and smaller than that in the unfolded state.

According to various embodiments, at least one angle detecting sensor configured to generate data for detecting an angle between the first surface 311 and the third surface 321 may be disposed in an inner space of the electronic device. According to an embodiment, a first motion sensor may be disposed as one angle detecting sensor on a first substrate (e.g., the first substrate assembly 361), and a second motion sensor may be disposed as another angle detecting sensor on a second substrate (e.g., the second substrate assembly 362). Each of the first motion sensor and the second motion sensor may include an acceleration sensor and/or a gyro sensor. Each motion sensor may measure the posture of the electronic device 300 and the angular velocity and/or acceleration of a surface on which the motion sensor is disposed, and transmit measurement data to the processor (e.g., the processor 120 in FIG. 1). Then, the processor may determine an angle, based on the data received from each motion sensor. According to another embodiment, the angle detecting sensor may include a sensor (e.g., an encoder sensor or a Hall sensor) attached to the hinge module 340 and configured to detect an angle. For example, the encoder or Hall sensor may transmit a non-continuous value designated for each angle formed by the first surface 311 and the third surface 321 to the processor (e.g., the processor 120 in FIG. 1), and the processor may determine an angle, based on the received value.

Figure 4:
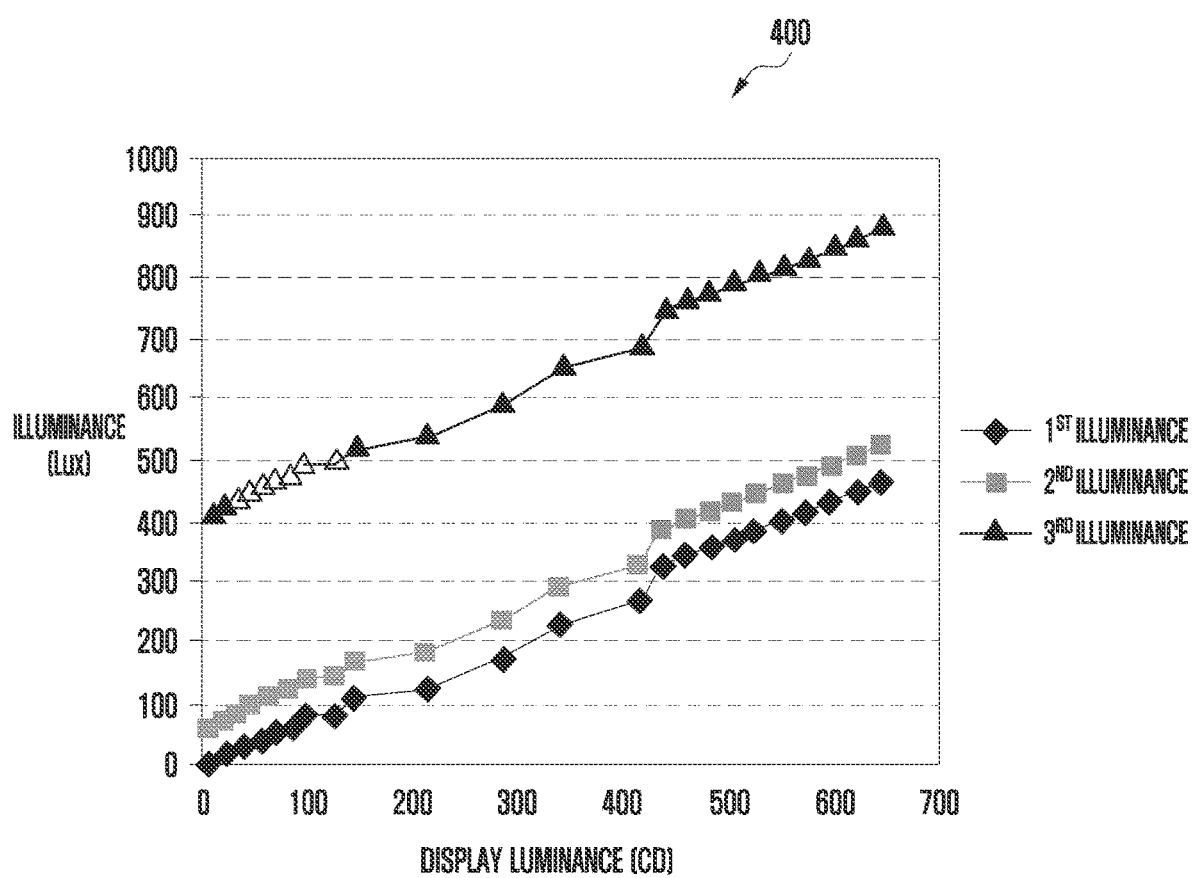
FIG. 4 is a graph showing examples of illuminance measured when image information is outputted on the display according to an embodiment of the disclosure.

FIG. 4 is a graph 400 showing examples of illuminance measured when image information is outputted on the display 399 according to an embodiment of the disclosure.

Referring to FIG. 4, the horizontal axis represents the luminance (cd: candela) based on color, brightness, and/or transparency of the image information outputted on the display (e.g., the display 399 in FIG. 3A), and the vertical axis represents the illuminance (lux) measured by the light sensor 304*a* when the image information is outputted on the display 399.

According to various embodiments, the first illuminance may be measured in an environment (e.g., a dark room) where external light is blocked, the second illuminance may be measured in a dark environment (e.g., 60 lux), and the third illuminance may be measured in a bright environment (e.g., 500 lux). In a state of zero luminance where the display 399 is outputting no image for each environment, the first to third illuminances can be measured relatively accurately. If the display 399 outputs an image, the illuminance measured by the light sensor 304*a* may increase in proportion to the brightness (luminance) of the display 399. For example, the light sensor (e.g., the light sensor 304*a* in FIG. 3) may not accurately measure an ambient illuminance due to the influence of light caused by an image outputted on the display 399.

Figure 5:
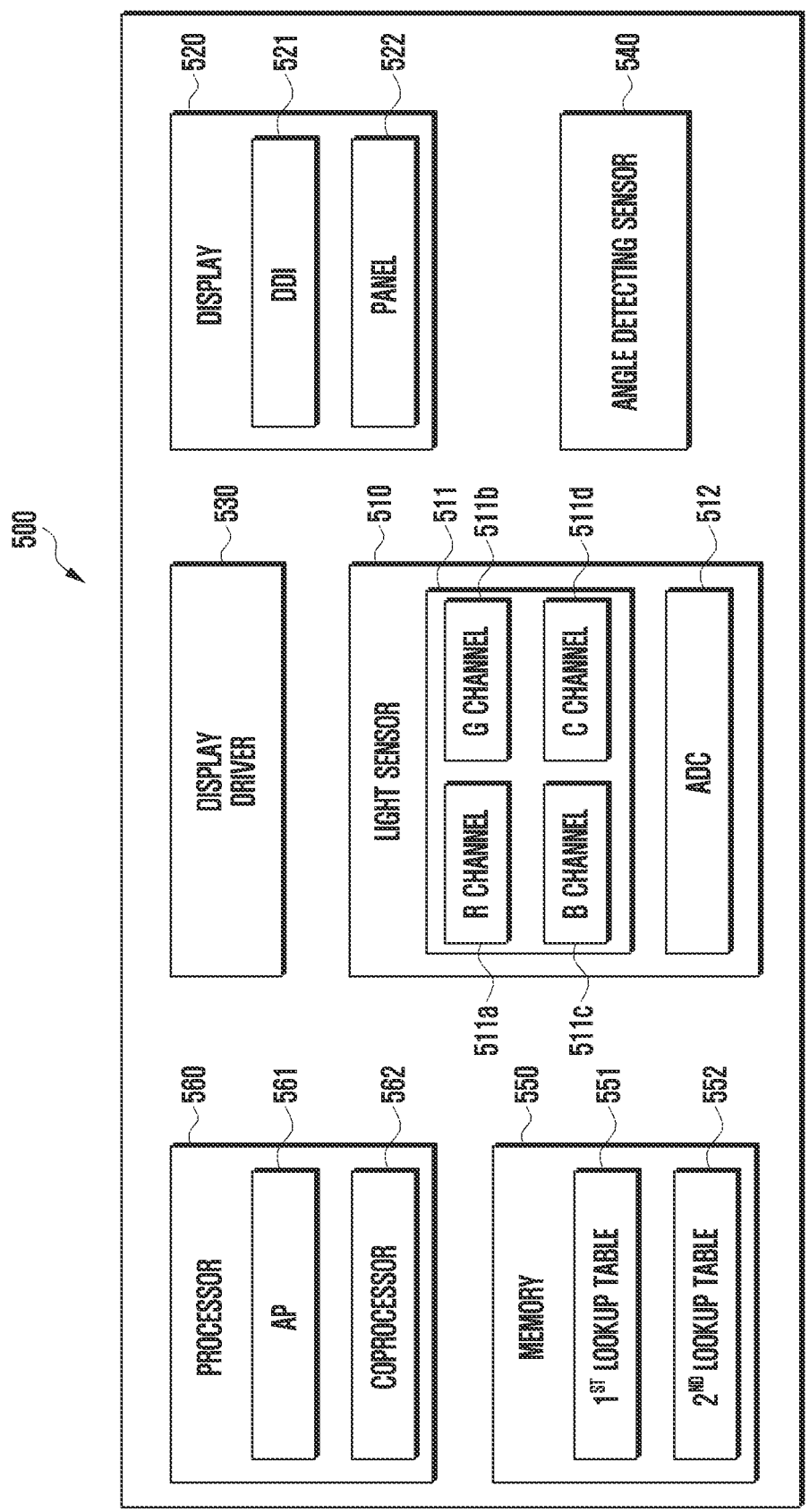
FIG. 5 is a block diagram illustrating a foldable mobile electronic device according to an embodiment of the disclosure.

FIG. 5 is a block diagram illustrating a foldable mobile electronic device 500 according to an embodiment of the disclosure.

Referring to FIG. 5, the electronic device 500 (e.g., the electronic device 300 in FIG. 3A) may include a light sensor 510, a display 520, a display driver 530, an angle detecting sensor 540, a memory 550, and a processor 560.

In an embodiment, the light sensor 510 (e.g., the light sensor 304*a* in FIG. 3G) may generate data used to identify an ambient illuminance around the electronic device 500. In an embodiment, the light sensor 510 includes at least one photodiode and may be implemented as one module (e.g., ASIC). The light sensor 410 may be molded (e.g., clear molding) to protect internal elements.

In an embodiment, the light sensor 510 includes a light receiver 511 for reading RGB values of visible light, and an analog-to-digital converter (ADC) 512 for digitizing the RGB values, and may output the digitized RGB values (ADC values) to the processor 560. For example, the light receiver 511 may include a photodiode that reacts to visible light (i.e., light having a wavelength of about 400 to 750 nm). The light receiver 511 may further include a photodiode that receives infrared rays. When facing an external light source, the light receiver 511 may generate a current by a photoelectric effect. The ADC 512 may convert the current into digital data (e.g., ADC values) and transmit the digital data to the processor 560. For example, if the light is strong, data indicating a high-value illuminance may be outputted to the processor 560, and if the light is weak, data indicating a relatively low-value illuminance may be outputted to the processor 560. The processor 560 may convert the data received from the light sensor 510 into an illuminance and, based on the illuminance, control the brightness of the display 520.

In an embodiment, the light receiver 511 may include a plurality of channels capable of measuring light. In an embodiment, the light receiver 511 may include a red (R) channel 511*a* for receiving red-based light (e.g., light having a wavelength of about 550 nm to 700 nm), a green (G) channel 511*b* for receiving green-based light (e.g., light having a wavelength of about 450 nm to 650 nm), a blue (B) channel 511*c* for receiving blue-based light (e.g., light having a wavelength of about 400 nm to 550 nm), and a clear (C) channel 511*d* for receiving white light (e.g., all of R, G, and B). The respective channels 511*a*, 511*b*, 511*c*, and 511*d* may include a photodiode. The R, G, and B channels 511*a*, 511*b*, and 511*c* may include a filter that transmits light of a corresponding wavelength.

In an embodiment, the light sensor 510 may include, in addition to the photodiode, at least one of various light-based sensors such as a color detection sensor (e.g., a picker sensor), a flicker sensor, an image sensor, a photoplethysmography (PPG) sensor, a proximity sensor, an iris sensor, a spectrometer sensor, and an ultraviolet (UV) sensor.

In an embodiment, the display 520 (e.g., the display 399 in FIG. 3G) may include a display driver IC (DDI) 521 and a display panel 522. The DDI 521 (e.g., the DDI 230 in FIG. 2) may control the display panel 522 (e.g., the display panel 210 in FIG. 2) to display image information. In an embodiment, the DDI 521 may control the display panel 522 to output image information in units of frames. The DDI 521 may provide color information of an image, being outputted or to be outputted, to another component (e.g., the processor 560). For example, the color information may include color on pixel ratio (COPR) information. In an embodiment, the COPR information may represent a ratio of an R value, a G value, and a B value. The R value is a red value ranging from 0 to 255, the G value is a green value ranging from 0 to 255, and the B value is a blue value ranging from 0 to 255. For example, the COPR information of a white screen may have values of (R, G, B: 255, 255, 255).

In an embodiment, the display driver 530 may adjust the brightness of the display 520 under the control of the processor 560. In an embodiment, based on a first command of the processor 560, the display driver 530 may perform an operation (hereinafter, referred to as a real-time adjustment operation) of adjusting the brightness of the display 520 in real time according to the illuminance identified using the light sensor 510. For example, the display driver 530 may receive first data (e.g., real time (RT) flag) representing the first command from the processor 560, and thereby perform the real-time adjustment operation. In addition, based on a second command of the processor 560, the display driver 530 may perform an operation (hereinafter, referred to as a hysteresis adjustment operation) of maintaining the brightness of the display 520 when the illuminance identified using the light sensor 510 falls within a certain illuminance range, and adjusting the brightness of the display 520 when the illuminance identified using the light sensor 510 is outside the illuminance range. For example, the processor 560 may stop, as the second command, the transmission of the first data, so that the display driver 530 may perform the hysteresis adjustment operation. Compared to the real-time adjustment operation, the hysteresis adjustment operation may prevent frequent changes in the display brightness. For example, in the real-time adjustment operation the display brightens as the illuminance is changed upward, whereas in the hysteresis adjustment operation the brightness of the display may be maintained even if the illuminance is upwardly changed to the same value. In an embodiment, the first data may include flag-form data (hereinafter, RT_flag) of one bit or more indicating an on/off state of the real-time adjustment operation (or indicating an on/off state of the hysteresis adjustment operation, or indicating an operation to be performed among the real-time adjustment operation and the hysteresis adjustment operation). Hereinafter, RT_flag will be described as an example for convenience of explanation, but the format of the first data is not limited. Any data that can indicate a switch between the hysteresis adjustment operation and the real-time adjustment operation may be used as the first data. In an embodiment, the processor 560 may periodically generate the first data. For example, the processor 560 may generate the first data once in a specified period (e.g., 100 ms).

In an embodiment, the display driver 530 may be implemented in software. Accordingly, the processor 560 may be configured to execute the display driver 530 to perform the above operations of the display driver 530. In this case, the operations of the display driver 530 may mean the operations of the processor 560.

In an embodiment, the angle detecting sensor 540 may generate data used to identify an angle. For example, the angle detecting sensor 540 may include a sensor (e.g., an encoder sensor or a Hall sensor) attached to the hinge module 340 shown in FIG. 3F. In another example, the angle detecting sensor 540 may include a first motion sensor disposed on the first substrate assembly 361 shown in FIG. 3F, and a second motion sensor disposed on the second substrate assembly 362 shown in FIG. 3F.

In an embodiment, the memory 550 (e.g., the memory 130 in FIG. 1) may store instructions that cause, when executed, the processor 560 to perform the above operations of the display driver 530, based on data received from the angle detecting sensor 540. In an embodiment, the instructions may cause the processor 560 to recognize a change from the folded state of the electronic device 500 to the partially folded state, based on data received from the angle detecting sensor 540. Also, in response to the state change, the instructions may cause the processor 560 to generate RT_flag such that the real-time adjustment operation is performed. In addition, when a specific time has elapsed after the state change or when an angle identified using data received from the light sensor 510 after the state change is outside a predetermined angle range (e.g., 0 to 179 degrees), the instructions may cause the processor 560 to stop the generation of RT_flag such that the hysteresis adjustment operation is performed.

In an embodiment, the memory 550 may store a first lookup table 551 (e.g., Table 1) used for the real-time adjustment operation, and a second lookup table 552 (e.g., Table 2) used for the hysteresis adjustment operation.

TABLE 1

| Illuminance (lux) | Luminance Code | Brightness (cd) |
|---|---|---|
| 0 | 1 | 10 |
| 1 | 2 | 15 |
| 2 | 3 | 20 |
| 3 | 4 | 25 |
| 4 | 5 | 30 |
| 5 | 6 | 35 |
| ... | ... | ... |
| 100 | 255 | 500 |

TABLE 2

| Brightness by illuminance Default | | | Brightness by hysteresis | | | |
|---|---|---|---|---|---|---|
| | | | When it gets darker | | When it gets brighter | |
| Illuminance (lux) | Luminance (cd/m²) | Code | Lower illuminance limit (lux) | Lower luminance (cd/m²) | Upper illuminance limit (lux) | Upper luminance (cd/m²) |
| 0 | 38 | 26 | — | — | 10 | 60 |
| 1 | 41 | 28 | — | — | 17 | 70 |
| 2 | 43 | 30 | — | — | 24 | 80 |
| 3 | 46 | 32 | — | — | 31 | 80 |
| 4 | 48 | 35 | — | — | 38 | 80 |
| 5 | 51 | 37 | — | — | 45 | 90 |
| 6 | 54 | 39 | — | — | 52 | 90 |
| 7 | 56 | 42 | — | — | 59 | 100 |
| 8 | 59 | 44 | — | — | 66 | 100 |
| 9 | 62 | 46 | — | — | 73 | 120 |
| 10 | 64 | 48 | 1 | 39 | 81 | 130 |
| ... | ... | ... | ... | ... | ... | ... |
| 15 | 77 | 60 | 2 | 42 | 122 | 150 |
| ... | ... | ... | ... | ... | ... | ... |
| 20 | 90 | 71 | 3 | 43 | 156 | 200 |
| ... | ... | ... | ... | ... | ... | ... |

TABLE 2-continued

| | Brightness by illuminance Default | | When it gets darker | | When it gets brighter | |
|---|---|---|---|---|---|---|
| | | | Lower | | Upper | |
| | | | illuminance | | illuminance | |
| Illuminance (lux) | Luminance (cd/m²) | Code | limit (lux) | Lower luminance (cd/m²) | limit (lux) | Upper luminance (cd/m²) |
| 25 | 104 | 83 | 4 | 45 | 186 | 300 |
| ... | ... | ... | ... | ... | ... | ... |
| 50 | 169 | 140 | 10 | 68 | 302 | 500 |
| ... | ... | ... | ... | ... | ... | ... |
| 100 | 300 | 255 | 40 | 100 | 402 | 1000 |

In an embodiment, the processor 560 (e.g., the processor 120 in FIG. 1) may include an application processor (AP) 561 and/or a coprocessor 562, and may be operatively connected to the light sensor 510, the display 520, the display driver 530, the angle detecting sensor 540, and the memory 550. The AP 561 (e.g., the main processor 121 in FIG. 1) may adjust the brightness of the display 520 by using data received from the light sensor 510 and/or the angle detecting sensor 540. The coprocessor 562 (e.g., a sensor hub processor) may control the overall operation of the sensor module (e.g., the sensor module 304 in FIG. 3A). The coprocessor 562 may be used for collecting and processing data from the sensor module at lower power than that of the AP 561. For example, the coprocessor 562 may convert data received from the light sensor 510 into an illuminance, read a luminance corresponding to the illuminance from a lookup table (e.g., Table 1), and notify it to the DDI 521. The coprocessor 562 may correct the illuminance, based on color information (e.g., COPR information) of an image displayed on the display 520, thereby preventing distortion of an ambient illuminance due to driving of the display 520. The coprocessor 562 may be omitted from the configuration of the electronic device 500, and thus the AP 561 may perform the function of the coprocessor 562.

In an embodiment, the processor 560 may convert data received from the light sensor 510 into an illuminance. The processor 560 may convert data received from the angle detecting sensor 540 into an angle. The processor 560 may recognize a state change of the electronic device 500, based on data received from the angle detecting sensor 540. The processor 560 may adjust the brightness of the display 520, based on the state change and the illuminance.

In an embodiment, when the angle is smaller than 10 degrees, for example, the processor 560 may recognize the state of the electronic device 200 as the folded state (e.g., the folded state in FIG. 3C). When the angle is changed to 10 degrees or more in the folded state, the processor 560 may recognize a state change (e.g., a first state change) from the folded state to the partially folded state. When the angle is changed to less than 10 degrees in the partially folded state, the processor 560 may recognize the reverse of the first state change. When the angle is out of a first angle range (e.g., the angle is changed to 179 degrees or more) in the partially folded state, the processor 560 may recognize a state change (e.g., a second state change) from the partially folded state to the unfolded state. When the angle enters the first angle range (e.g., the angle is changed to less than 179 degrees) in the unfolded state, the processor 560 may recognize the reverse of the second state change.

In an embodiment, in response to the first state change, the processor 560 may activate the light sensor 510 and convert data received from the light sensor 510 into an illuminance. Hereinafter, the illuminance identified in response to the first state change may be referred to as a wake-up illuminance. The processor 560 may read a luminance (i.e., a wake-up luminance) corresponding to the wake-up illuminance from the second lookup table 552 (e.g., Table 2), set the wake-up luminance to the brightness of the display 520, and turn on the display 520.

In an embodiment, the processor 560 may perform the real-time adjustment operation in response to the first state change. In an embodiment, for a certain time after the first state change or while the electronic device 500 moves to the unfolded state after the first state change (e.g., until the second state change), the processor 560 may convert data received from the light sensor 510 into an illuminance, identify a luminance corresponding to the illuminance in the first lookup table 551, and adjust the brightness of the display 520 to the identified luminance. For example, the processor 560 may adjust the brightness of the display 520 by reacting to an ambient illuminance in real time. In another embodiment, the processor 560 may generate RT_flag for a certain time after the first state change or before the second state change. While the RT_flag is generated, the display driver 530 may identify a luminance corresponding to the illuminance received from the processor 560 in the first lookup table 551 and adjust the brightness of the display 520 to the identified luminance. For example, while RT_flag is generated, the processor 560 may perform the real-time adjustment operation.

In an embodiment, the processor 560 may determine whether the state of the electronic device 500 satisfies a condition for the hysteresis adjustment operation, and perform the hysteresis adjustment operation based on the determination result.

In an embodiment, the processor 560 may perform the hysteresis adjustment operation based on the wake-up illuminance when a specific time (e.g., 1 second) has elapsed after the first state change. For example, based on the wake-up illuminance, the processor 560 may set a reference illuminance range for determining whether to adjust brightness. Referring to Table 2, when the wake-up illuminance is 50 lux, the lower limit and the upper limit of the reference illuminance range may be 10 lux and 302 lux, respectively. The processor 560 may maintain the brightness of the display 520 when an illuminance identified using data received from the light sensor 510 is within the reference illuminance range. The processor 560 may adjust the brightness of the display 520 when an illuminance identified using data received from the light sensor 510 is out of the reference illuminance range or out of for a specific time. For example, the processor 560 may identify, in the second lookup table 552, a luminance corresponding to an illuminance measured after exceeding a luminance or range corresponding to an average of illuminances measured for the specific time, and adjust the brightness of the display 520 with the identified luminance. Referring to Table 2, when the wake-up illuminance is 50 lux and the illuminance falls below 10 lux, the processor 560 may adjust a current luminance (e.g., a luminance currently set as the brightness of the display 520 by the real-time adjustment operation) to 68 cd. If the illuminance rises above 302 lux, the processor 560 may adjust the current luminance to 500 cd.

In another embodiment, in response to the second state change, the processor 560 may perform the hysteresis adjustment operation based on the wake-up illuminance. In another embodiment, when an angle identified after the first state change falls within a specific second angle range (e.g., 45 to 150 degrees) and is maintained for a given time, the processor 560 may perform the hysteresis adjustment operation based on the wake-up illuminance. In yet another embodiment, when a specific time has elapsed after the first state change, when the second state change is made, or when an angle identified after the first state change falls within a specific second angle range (e.g., 45 to 150 degrees) and is maintained for a given time, the processor 560 may stop the generation of RT_flag. When the generation of RT_flag is interrupted, the display driver 530 may perform the hysteresis adjustment operation based on the wake-up illuminance.

In an embodiment, based on a turn-on and turn-off cycle of the display 520, the processor 560 may set a measurement time (e.g., an integration time) and measurement cycle for the light sensor 510 to obtain light. For example, the display 520 may display frames while repeating turn-on and turn-off several times. Due to the effect of the turn-on of the display 520, the ambient illuminance around the electronic device 500 may be distorted, for example, as shown in FIG. 4. In order to prevent such distortion, the processor 560 may convert data received from the light sensor 510 into an illuminance while the display 520 is turned off.

In an embodiment, the first lookup table 551 may be used for manual adjustment. For example, referring to Table 1, the first lookup table 551 may contain luminance codes 1 to 255 corresponding to luminance values. The processor 560 may display a brightness control bar on the display 520. The display 520 may be a touch-sensitive display and thus may output data indicating a touched position on the brightness control bar to the processor 560. Then, the processor 560 may recognize a luminance code corresponding to the received data, identify a luminance value corresponding to the recognized code in the first lookup table 551, and set the identified luminance as the brightness of the display 520.

In an embodiment, the real-time adjustment operation may be performed based on a user's setting. For example, the processor 560 may learn a user's pattern of using the brightness control bar and thereby determine whether the user dislikes or likes a bright screen. If it is determined that the user dislikes a bright screen, the processor 560 may adjust the brightness of the display 520 in a range of luminance codes 1 to 128. If it is determined that the user likes a bright screen, the processor 560 may adjust the brightness of the display 520 in a range of luminance codes 129 to 255. For example, the processor 560 may set the maximum brightness and minimum brightness of the display 520 differently depending on user's sensitivity to brightness.

Figure 6:
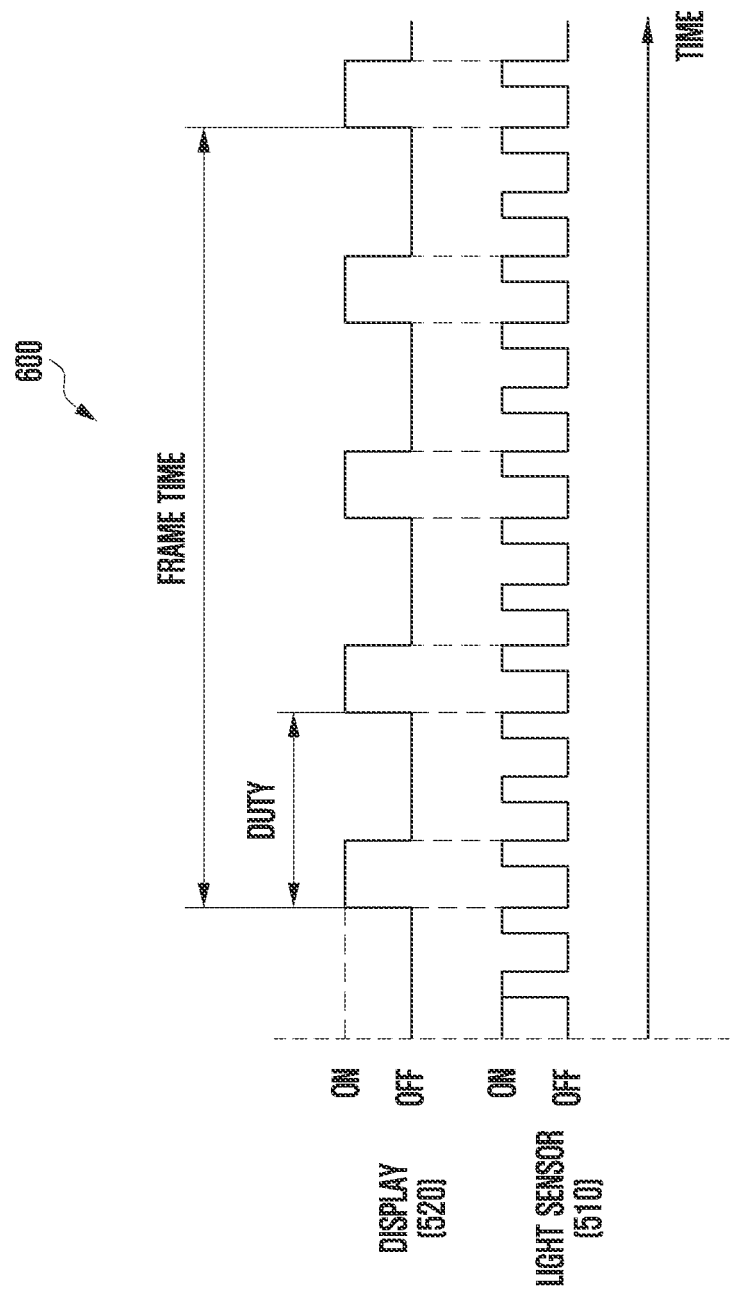
FIG. 6 is a diagram illustrating an illuminance measurement operation based on a turn-on and turn-off cycle of a display according to an embodiment of the disclosure.

FIG. 6 is a diagram 600 illustrating an illuminance measurement operation based on a turn-on and turn-off cycle of a display according to an embodiment of the disclosure.

Referring to FIG. 6, the display 520 according to an embodiment may repeat turn-on and turn-off several times for a time of displaying one frame. A time (e.g., 16.6 ms) during which all scan lines of the display 520 are sequentially operated may be the aforementioned time of displaying one frame (i.e., a frame time). That is, in one frame time, turn-on and turn-off of the display 520 may be repeated several times (e.g., four times as shown). One turn-on and turn-off time may be referred to as a duty, and a ratio of a turn-on time to the total time of one duty (e.g., 4.16 ms) may be referred to as a duty ratio.

In an embodiment, the light sensor 510 may repeat turn-on and turn-off several times in one frame time. A cycle in which the light sensor 510 is turned on and off may be shorter than a cycle in which the display 520 is turned on and off.

In an embodiment, the processor 560 may set a turn-on and turn-off cycle and a duty ratio of the display 520. The processor 560 may set a turn-on time of the light sensor 510 to be shorter than a turn-on time of the display 520 such that the light sensor 510 is turned on while the display 520 is turned off. The processor 560 may calculate an illuminance by using data received from the light sensor 510 while the display 520 is turned off. When calculating an illuminance, the processor 560 may exclude data received from the light sensor 510 while the display 520 is turned on.

In an embodiment, the processor 560 may measure an ambient illuminance around the electronic device 500 by using data received from the light sensor 510. The processor 560 may correct the measured illuminance, based on color information (e.g., COPR information) of an image displayed on the display 520, thereby preventing distortion of the ambient illuminance due to driving of the display 520.

Figure 7:
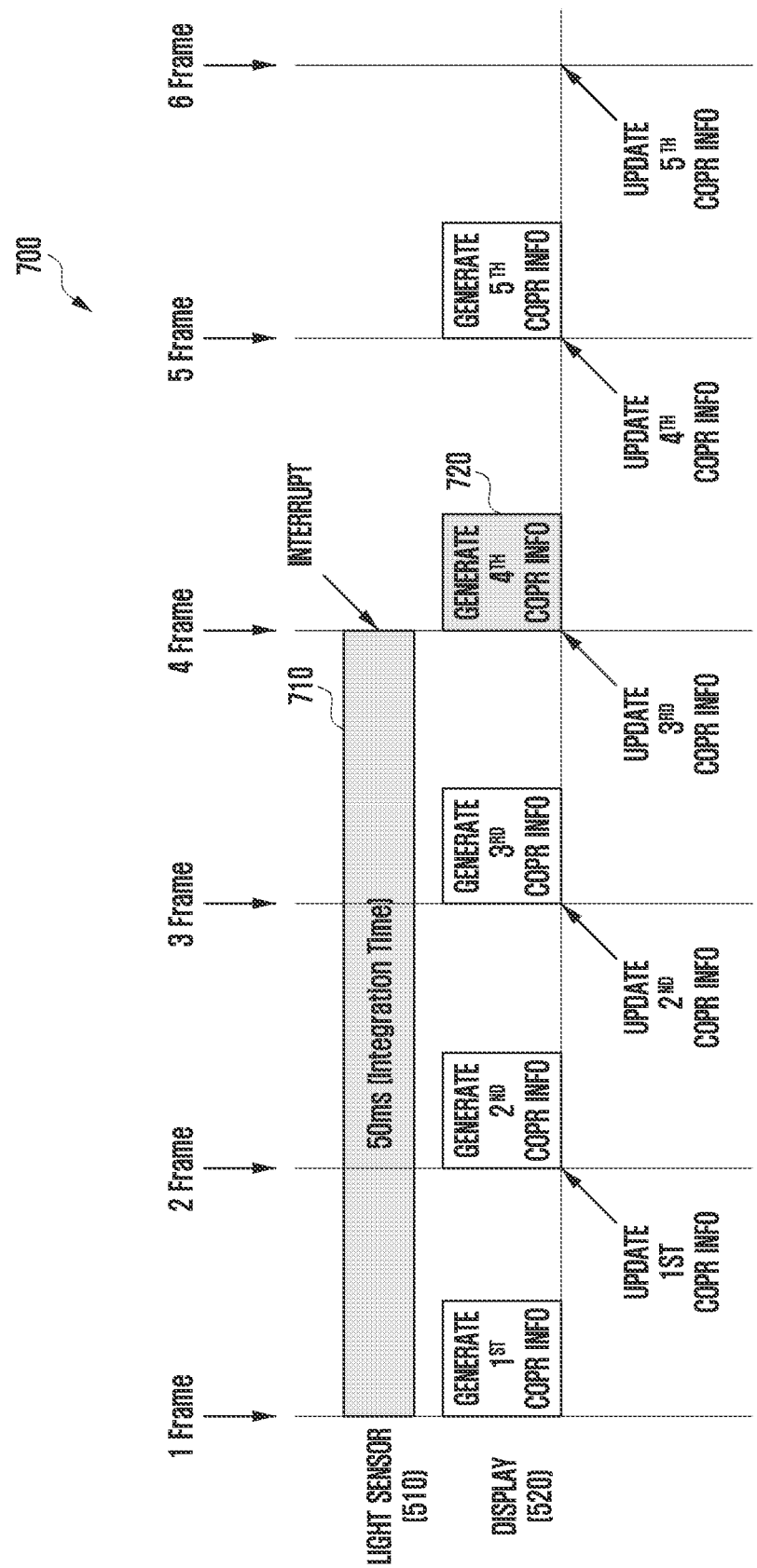
FIG. 7 is a diagram illustrating an illuminance correction operation based on color information of an image according to an embodiment of the disclosure.

FIG. 7 is a diagram 700 illustrating an illuminance correction operation based on color information of an image according to an embodiment of the disclosure.

Referring to FIG. 7, the light sensor 510 according to an embodiment may receive light for a specific measurement time 710 (e.g., 50 ms), convert the received light into data, and provide it to the processor 560. The light sensor 510 may generate an interrupt signal at the time of providing data.

In an embodiment, the display 520 may display image information frame by frame for a specific frame time (e.g., 16.6 ms), generate COPR information corresponding to the frame, and transmit the COPR information to the processor 560 (e.g., the coprocessor 562).

In an embodiment, the processor 560 may update COPR information stored in the memory 550, based on the COPR information received from the display 520. The processor 560 may recognize the occurrence of the interrupt signal and then identify COPR information (e.g., in FIG. 7, the fourth COPR information 720 for the fourth frame displayed on the display 520) in the memory 550.

In an embodiment, the processor 560 may measure the ambient illuminance around the electronic device 500 by using data received from the light sensor 510, and correct the measured illuminance, based on the COPR information identified in response to the occurrence of the interrupt signal. For example, the processor 560 may calculate an illuminance (noise component) corresponding to the brightness of the display 520, based on COPR information, and remove the noise component from the measured illuminance, so that the measured illuminance is corrected to converge on the actual ambient illuminance around the electronic device 500.

Figure 8A:
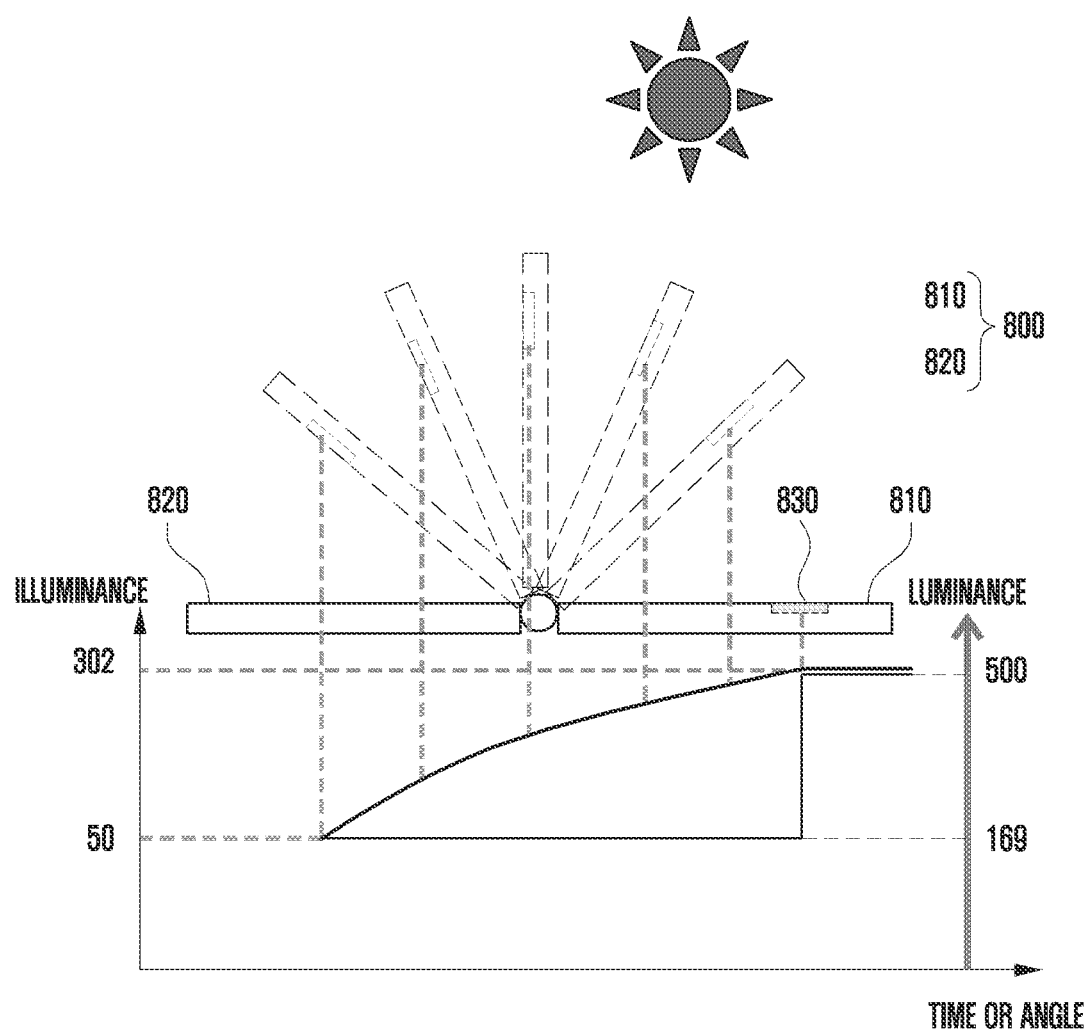
FIG. 8A is a diagram illustrating a change in brightness of a display depending on illuminance when a hysteresis adjustment operation is performed while a state of a foldable mobile electronic device is changed from a folded state to an unfolded state according to an embodiment of the disclosure.
Figure 8B:
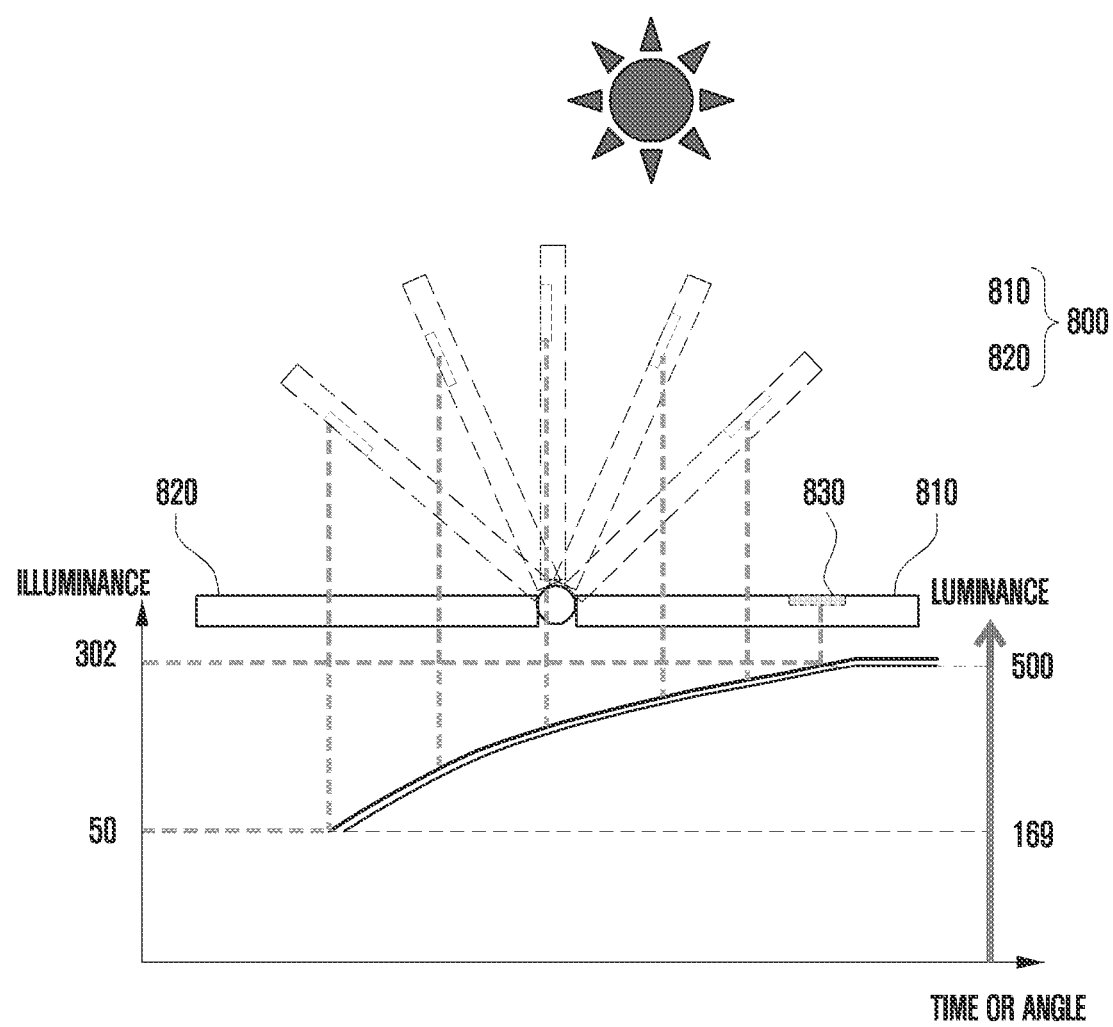
FIG. 8B is a diagram illustrating a change in brightness of a display depending on illuminance when a real-time adjustment operation and a hysteresis adjustment operation are sequentially performed while a state of a foldable mobile electronic device is changed from a folded state to an unfolded state according to an embodiment of the disclosure.

FIG. 8A is a diagram illustrating a change in brightness of a display depending on illuminance when a hysteresis adjustment operation is performed while a state of a foldable mobile electronic device is changed from a folded state to an unfolded state according to an embodiment of the disclosure. FIG. 8B is a diagram illustrating a change in brightness of a display depending on illuminance when a real-time adjustment operation and a hysteresis adjustment operation are sequentially performed while a state of a foldable mobile electronic device is changed from a folded state to an unfolded state according to an embodiment of the disclosure.

Referring to FIGS. 8A and 8B, a foldable mobile electronic device 800 (e.g., the electronic device 300 in FIG. 3A) may have a foldable structure composed of an upper portion 810 (e.g., the first housing 310 in FIG. 3A) and a lower portion 820 (e.g., the second housing 320 in FIG. 3A). One portion of the display (e.g., the first flat portion 330a in FIG. 3B) may be disposed in the upper portion 810, and another portion of the display (e.g., the second flat portion 330b in FIG. 3B) may be disposed in the lower portion 820. A light sensor 830 (e.g., the light sensor 304a in FIG. 3G) may be disposed in the upper portion 810 to face the lower portion 820 when the electronic device 800 is folded.

Even in a bright environment around the electronic device 800, the electronic device 800 may measure an illuminance lower than an actual ambient illuminance around the electronic device 800 when the electronic device 800 is opened. This is because the light sensor 830 faces the lower portion 820 in the folded state. However, as being gradually unfolded, the electronic device 800 may measure the actual illuminance corresponding to the bright environment. During the illuminance measurement, the electronic device 800 may perform the operation shown in FIG. 6 and/or the operation shown in FIG. 7.

According to a comparative example shown in FIG. 8A, the electronic device 800 (e.g., the processor 560 in FIG. 5) may perform the hysteresis adjustment operation based on the wake-up illuminance when being opened (i.e., in case of the first state change). For example, referring to Table 2, when the wake-up illuminance is 50 lux, the electronic device 800 may set the brightness of the display to a luminance of 169 cd corresponding to 50 lux. If the measured illuminance does not exceed 302 lux which is an upper limit corresponding to the wake-up illuminance, the electronic device 800 may maintain the brightness of the display at 169 cd without change. As time elapses or as an angle increases, that is, the electronic device 800 is gradually unfolded, the illuminance measured by the electronic device 800 may gradually increase and then exceed the upper limit of 302 lux at some point. As the measured illuminance exceeds the upper limit, the electronic device 800 may rapidly change the brightness of the display from 169 cd to 500 cd. Such a sudden change in brightness may cause fatigue in user's eyes.

According to an embodiment shown in FIG. 8B, the electronic device 800 (e.g., the processor 560 in FIG. 5) may perform the real-time adjustment operation until the state of the electronic device 800 satisfies a given condition after the electronic device 800 is opened (i.e., in case of the first state change). For example, referring to Table 2, when the wake-up illuminance is 50 lux, the electronic device 800 may set the brightness of the display to a luminance of 169 cd corresponding to 50 lux. As time elapses or as an angle increases, that is, the electronic device 800 is gradually unfolded, the illuminance measured by the electronic device 800 may gradually increase. Accordingly, the electronic device 800 may gradually set the display brighter. While performing the real-time adjustment operation, the electronic device 800 may recognize the second state change (e.g., the angle is out of the first angle range) or the elapse of a certain time after the first state change. Then, the electronic device 800 may perform the hysteresis control operation based on the wake-up illuminance.

In some embodiments, the user may use the electronic device 800 in the partially folded state without fully unfolding it. If an angle is within the second angle range (e.g., 45 to 150 degrees) and maintained for a predetermined time, the electronic device 800 may perform the hysteresis adjustment operation based on the wake-up illuminance. For example, the processor may recognize that the electronic device 800 is maintained for a certain time (e.g., 1 second) or more at a specific angle (e.g., 91 degrees) within the second angle range, and may determine that this state satisfies a predefined condition for performing the hysteresis adjustment operation. In another example, the processor may identify an angle (e.g., 91 degrees) that is within the second angular range, and may check whether the identified angle varies only within a third angle range (or error range) (e.g. 10 degrees). The third angle range may include, for example, a threshold value (e.g., 5 degrees or 10 degrees) of angle variation used to determine the angle maintenance or not. For example, the third angle range may be set to 5 degrees. When an angle is varied only between 91 and 95 degrees, which is within 5 degrees, for a certain time, the processor may determine that this angle variation corresponds to the above condition.

As described in the embodiment of FIG. 8B, the electronic device 800 is capable of preventing a sudden change in brightness, when unfolded, thereby reducing the user's eyestrain.

Figure 9:
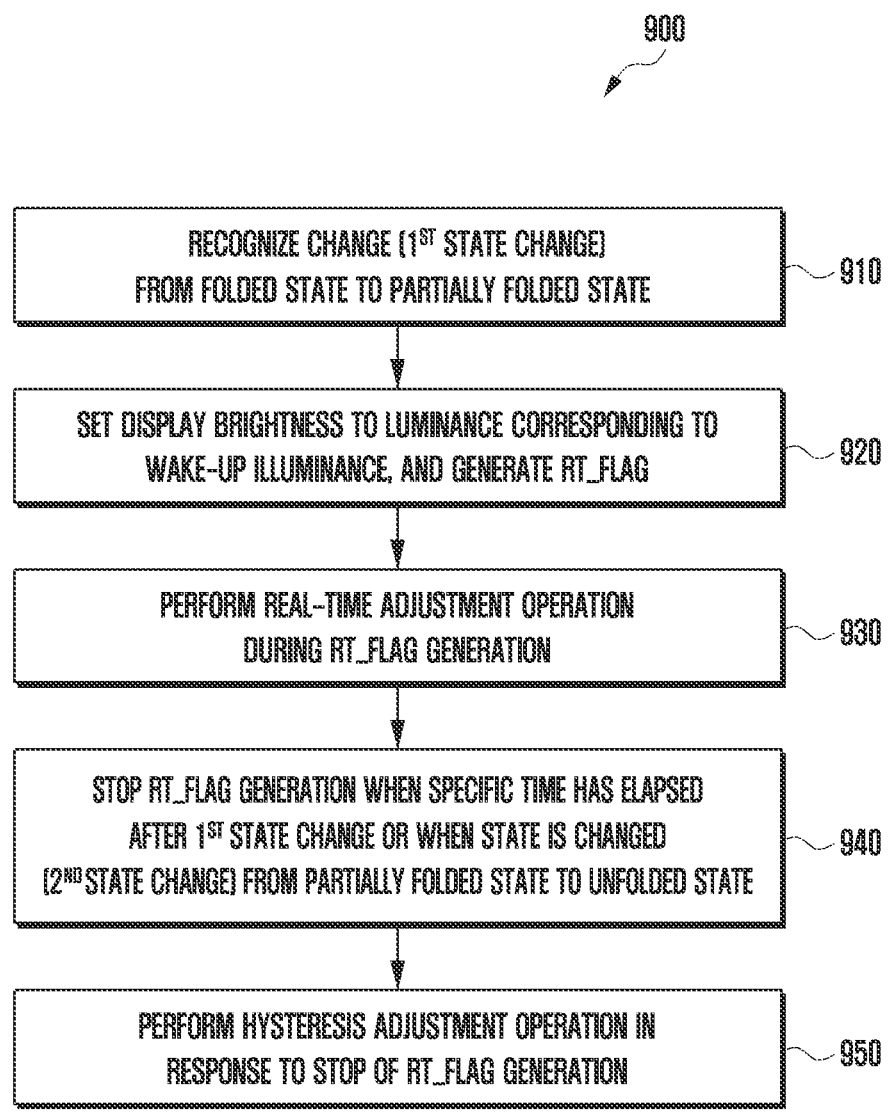
FIG. 9 illustrates operations of automatically adjusting the brightness of a display while the state of a foldable mobile electronic device is changed from a folded state to an unfolded state according to an embodiment of the disclosure.

FIG. 9 illustrates operations 900 of automatically adjusting the brightness of a display while the state of a foldable mobile electronic device is changed from a folded state to an unfolded state according to an embodiment of the disclosure.

Referring to FIG. 9, the operations of 900 may be performed by a processor (e.g., the processor 560 in FIG. 5) and/or a display driver (e.g., the display driver 530 in FIG. 5).

According to an embodiment, at operation 910, the processor may recognize based on data received from the angle detecting sensor that the state of the foldable mobile electronic device is changed from the folded state to the partially folded state (i.e., the first state change).

According to an embodiment, at operation 920, the processor may activate the light sensor in response to the first state change, identify a wake-up illuminance by using data received from the light sensor, and transmit the wake-up illuminance to the display driver to set the brightness of the display to a luminance corresponding to the wake-up illuminance. For example, the display driver may identify a wake-up luminance corresponding to the received wake-up illuminance in a lookup table (e.g., Table 2), and set the wake-up luminance as the brightness of the display. Further, the processor may periodically generate RT_flag in response to the first state change. The processor may set a reference illuminance range for the hysteresis adjustment operation, based on the wake-up illuminance, for example, with reference to data (e.g., Table 2) stored in the memory (e.g., the memory 550 in FIG. 5). The light sensor may be disposed under the display (e.g., the arrangement structure shown in FIG. 3G), and thus the processor may identify the illuminance by performing, for example, the operation shown in FIG. 6. In addition, the processor may correct the identified illuminance by performing, for example, the operation shown in FIG. 7.

According to an embodiment, at operation 930, the display driver may identify, in a lookup table (e.g., Table 1), the luminance corresponding to the illuminance received from the processor while the RT_flag is generated. In addition, the display driver may perform the real-time adjustment operation of adjusting the brightness of the display to the identified luminance.

According to an embodiment, at operation 940, the processor may stop the generation of the RT_flag when a specific time has elapsed after the first state change or which the state is changed from the partially folded state to the unfolded state (i.e., the second state change).

According to an embodiment, at operation 950, the display driver may perform the hysteresis adjustment operation based on the wake-up illuminance in response to the stop of the RT_flag generation. For example, the display driver may maintain the brightness of the display when the illuminance received from the processor is within the reference illuminance range. When the illuminance received from the processor is out of the reference illuminance range, the display driver may change the brightness of the display, based on the received illuminance.

Figure 10:
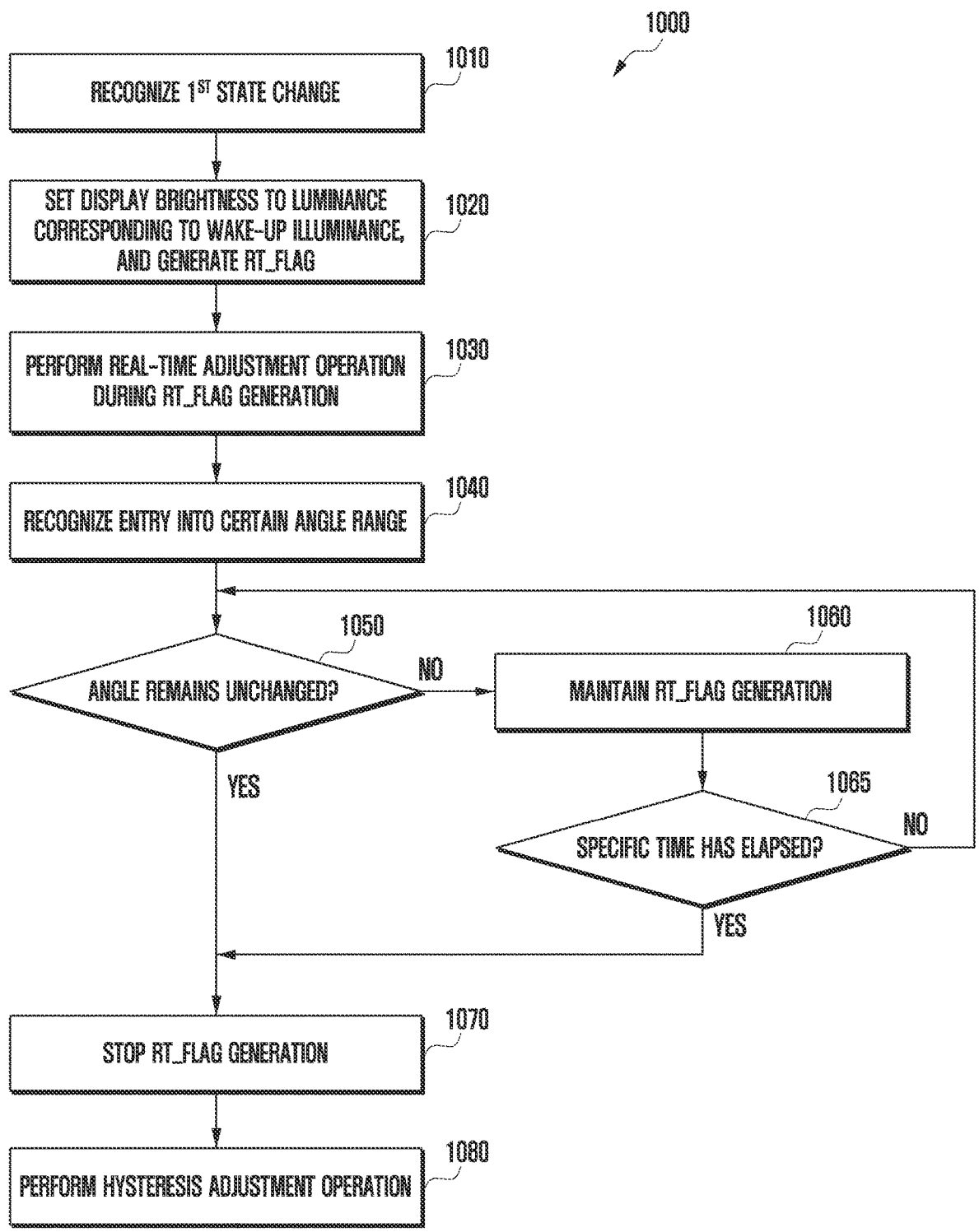
FIG. 10 illustrates operations of automatically adjusting the brightness of a display while the state of a foldable mobile electronic device is changed from a folded state to an unfolded state according to an embodiment of the disclosure.

FIG. 10 illustrates operations 1000 of automatically adjusting the brightness of a display while the state of a foldable mobile electronic device is changed from a folded state to an unfolded state according to an embodiment of the disclosure. Hereinafter, descriptions overlapped with those of FIG. 9 may be simplified or omitted.

Referring to FIG. 10, the operations of 1000 may be performed by a processor (e.g., the processor 560 in FIG. 5) and a display driver (e.g., the display driver 530 in FIG. 5).

According to an embodiment, at operation 1010, the processor may recognize the first state change, based on data received from the angle detecting sensor.

According to an embodiment, at operation 1020, the processor may activate the light sensor in response to the first state change, identify a wake-up illuminance by using data received from the light sensor, and transmit the wake-up illuminance to the display driver to set the brightness of the display to a luminance corresponding to the wake-up illuminance. Further, the processor may periodically generate RT_flag in response to the first state change. The processor may set a reference illuminance range, based on the wake-up illuminance. The light sensor may be disposed under the display, and thus the processor may perform the operation shown in FIG. 6 and/or the operation shown in FIG. 7.

According to an embodiment, at operation 1030, the display driver may perform the real-time adjustment operation while the RT_flag is generated. For example, the display driver may adjust the brightness of the display in real time without hysteresis in accordance with the illuminance identified using the light sensor.

According to an embodiment, at operation 1040, the processor may recognize that an angle identified using data received from the angle detecting sensor after the first state change has entered a predetermined angle range (e.g., the second angle range).

According to an embodiment, at operation 1050, the processor may determine whether an angle identified after the entry recognition is maintained without change. For example, the processor may determine whether an angle is maintained for a given time within an error range (e.g., the third angle range).

According to an embodiment, when it is determined that the angle changes as the user unfolds the electronic device (i.e., branch NO of the operation 1050, the processor may maintain the generation of RT_flag at operation 1060. Then, at operation 1065, the processor may determine whether a specific time has elapsed after the first state change (e.g., whether a specific time has elapsed from a time point of recognizing the first state change at the operation 1010). If the specific time has not elapsed (i.e., branch NO of the operation 1065), the processor may perform the operation 1050 again.

According to an embodiment, as the user stops an unfolding action while unfolding the electronic device, the angle may be maintained without change. As such, when it is determined that the angle is maintained (i.e., branch YES of the operation 1050), or when the specific time has elapsed after the first state change (i.e., branch YES of the operation 1065), the processor may stop the generation of the RT_flag at operation 1070.

According to an embodiment, at operation 1080, the display driver may perform the hysteresis adjustment operation based on the wake-up illuminance in response to the stop of the RT_flag generation.

Figure 11:
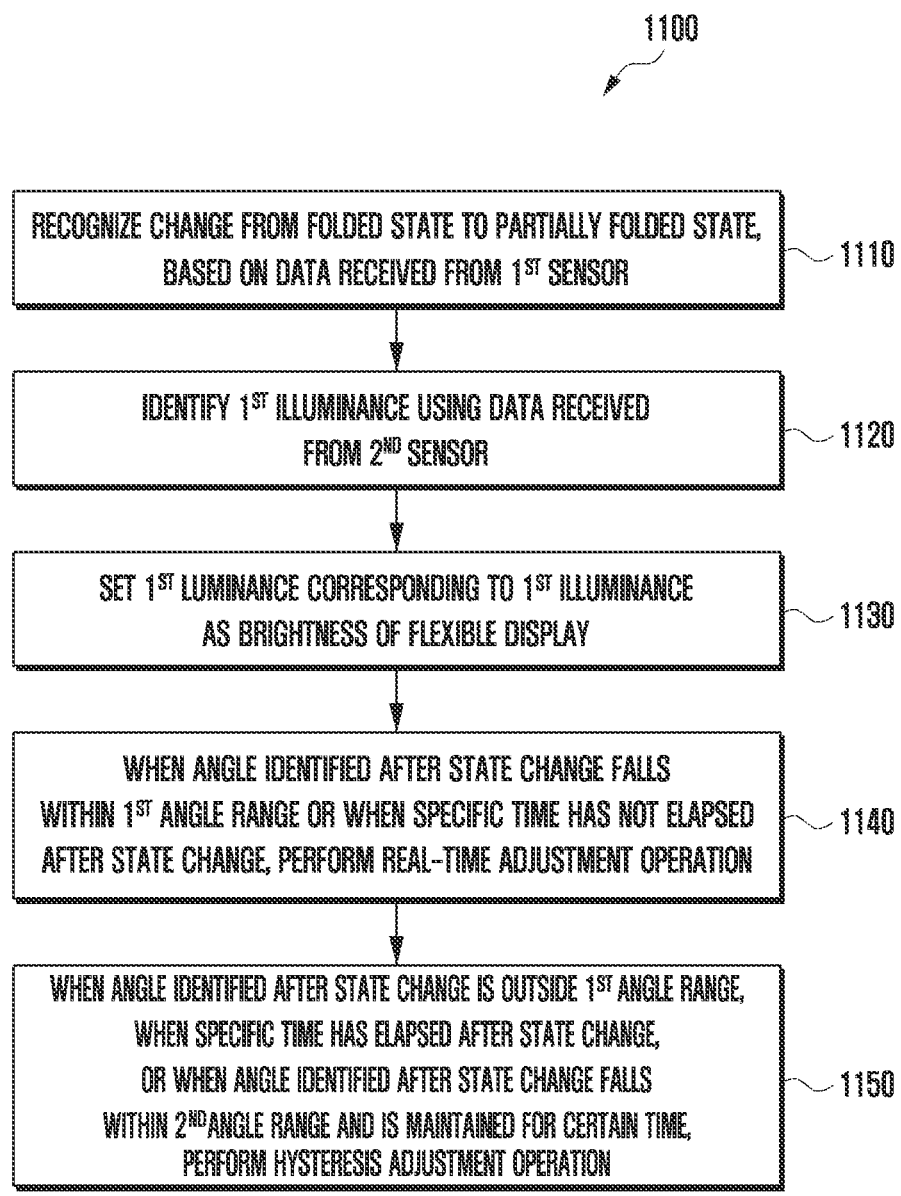
FIG. 11 illustrates operations of automatically adjusting the brightness of a display while the state of a foldable mobile electronic device is changed from a folded state to an unfolded state according to an embodiment of the disclosure.

FIG. 11 illustrates operations 1100 of automatically adjusting the brightness of a display while the state of a foldable mobile electronic device is changed from a folded state to an unfolded state according to an embodiment of the disclosure. Hereinafter, descriptions overlapped with those of FIG. 9 may be simplified or omitted.

Referring to FIG. 11, the operations of 1100 may be performed by a processor (e.g., the processor 560 in FIG. 5).

According to an embodiment, at operation 1110, based on data received from a first sensor (e.g., the angle detecting sensor 540 in FIG. 5), the processor may recognize a change (e.g., the first state change) in the state of the foldable mobile electronic device from the folded state to the partially folded state before reaching the unfolded state.

According to an embodiment, at operation 1120, based on the recognized state change, the processor may identify a first illuminance (e.g., the wake-up illuminance) by using data received from a second sensor (e.g., the light sensor 510 in FIG. 5).

According to an embodiment, at operation 1130, the processor may set a first luminance (e.g., the wake-up luminance) corresponding to the first illuminance as the brightness of the flexible display.

According to an embodiment, at operation 1140, when an angle identified using the first sensor after the state change falls within a predetermined first angle range (e.g., smaller than 179 degrees) or when a specific time has not elapsed after the state change, the processor may perform the real-time adjustment operation, based on a second illuminance identified using the second sensor.

According to an embodiment, at operation 1150, when the angle identified after the state change is outside the first angle range (e.g., the second state change), when the specific time has elapsed after the state change, or when the angle identified after the state change falls within a predetermined second angle range (e.g., 45 to 150 degrees) and is maintained for a certain time, the processor may perform the hysteresis adjustment operation based on the first illuminance.

According to various embodiments, a foldable mobile electronic device may include a first housing; a second housing; a hinge assembly rotatably connecting the first housing and the second housing; a flexible display disposed to extend from one area of the first housing to one area of the second housing across the hinge assembly; a first sensor generating data used to identify an angle formed between the first housing and the second housing; a second sensor generating data used to identify an ambient illuminance around the foldable mobile electronic device, and disposed in the second housing to face the first housing when the foldable mobile electronic device is in a folded state; and a processor connected to the display, the first sensor, and the second sensor. The processor may be configured to recognize, based on the data received from the first sensor, a change in a state of the foldable mobile electronic device from the folded state to a partially folded state before reaching an unfolded state, to identify a first illuminance by using the data received from the second sensor, based on the recognized state change, to set a first luminance corresponding to the first illuminance as a brightness of the display, to when an angle identified after the state change falls within a predetermined first angle range or when a specific time has not elapsed after the state change, perform a real-time adjustment operation on the brightness of the display, based on a second illuminance identified using the second sensor, and to when the angle identified after the state change is outside the first angle range or when the specific time has elapsed after the state change, perform a hysteresis adjustment operation on the brightness of the display, based on the first illuminance.

The processor may be configured to, as the real-time adjustment operation, identify a second luminance corresponding to the second illuminance in a first lookup table, and set the second luminance as the brightness of the display.

The processor may be configured to, as the hysteresis adjustment operation, when a third illuminance identified using the second sensor after the state change falls within an illuminance range set based on the first illuminance, maintain the brightness of the display without change, and to when the third illuminance is outside the illuminance range, identify a third luminance corresponding to the third illuminance in a second lookup table, and set the third luminance as the brightness of the display.

The foldable mobile electronic device may further include a display driver. The processor may be configured to transmit a flag to the display driver when the angle identified after the state change falls within the first angle range or when the specific time has not elapsed after the state change. The display driver may be configured to perform the real-time adjustment operation while the flag is received from the processor, and perform the hysteresis adjustment operation when receiving the flag from the processor is stopped.

The processor may be configured to perform the hysteresis adjustment operation when the angle identified after the state change falls within a predetermined second angle range and is maintained for a specific time, and the second angle range may be within the first angle range.

The second sensor may be disposed under the display when the display is viewed from above, and the processor may be configured to identify an illuminance by using data received from the second sensor while the display is turned off.

A cycle in which the second sensor is turned on and off may be shorter than a cycle in which the display is turned on and off.

The second sensor may be disposed under the display when the display is viewed from above, and the processor may be configured to correct an illuminance identified using data received from the second sensor, based on color information of an image to be displayed on the display.

The color information may include color on pixel ratio (COPR) information.

The display may include a display driver IC and a display panel, and the display driver IC may be configured to control the display panel to output image information in a frame unit, and to transmit COPR information of a frame to be output to the processor.

The first sensor may include an encoder sensor or a Hall sensor attached to the hinge assembly.

The first sensor may include a first motion sensor disposed in the first housing and a second motion sensor disposed in the second housing.

The first motion sensor and the second motion sensor may include an acceleration sensor and/or a gyro sensor.

The second sensor may include a red (R) channel for receiving red-based light, a green (G) channel for receiving green-based light, a blue (B) channel for receiving blue-based light, and a clear (C) channel for receiving white light.

According to various embodiments, a foldable mobile electronic device may include a first housing; a second housing; a hinge assembly rotatably connecting the first housing and the second housing; a flexible display disposed to extend from one area of the first housing to one area of the second housing across the hinge assembly; a first sensor generating data used to identify an angle formed between the first housing and the second housing; a second sensor generating data used to identify an ambient illuminance around the foldable mobile electronic device, and disposed in the second housing to face the first housing when the foldable mobile electronic device is in a folded state; and a processor connected to the display, the first sensor, and the second sensor. The processor may be configured to recognize, based on the data received from the first sensor, a change in a state of the foldable mobile electronic device from the folded state to a partially folded state before reaching an unfolded state, to identify a first illuminance by using the data received from the second sensor, based on the recognized state change, to set a first luminance corresponding to the first illuminance as a brightness of the display, to while the foldable mobile electronic device is changed from the folded state to the unfolded state, perform a real-time adjustment operation on the brightness of the display, based on a second illuminance identified using the second sensor, and to when the angle identified after the state change falls within a predetermined angle range and is maintained for a specific time, perform a hysteresis adjustment operation on the brightness of the display, based on the first illuminance.

The processor may be configured to, as the real-time adjustment operation, identify a second luminance corresponding to the second illuminance in a first lookup table, and set the second luminance as the brightness of the display.

The processor may be configured to, as the hysteresis adjustment operation, when a third illuminance identified using the second sensor after the state change falls within an illuminance range set based on the first illuminance, maintain the brightness of the display without change, and to when the third illuminance is outside the illuminance range, identify a third luminance corresponding to the third illuminance in a second lookup table, and set the third luminance as the brightness of the display.

The foldable mobile electronic device may further include a display driver. The processor may be configured to generate a flag while the foldable mobile electronic device is changed from the folded state to the unfolded state, and stop generating the flag when the angle identified after the state change falls within the angle range and is maintained for the specific time. The display driver may be configured to perform the real-time adjustment operation while the flag is generated, and perform the hysteresis adjustment operation when generating the flag is stopped.

The second sensor may be disposed under the display when the display is viewed from above. The processor may be configured to identify an illuminance by using data received from the second sensor while the display is turned off.

The second sensor may be disposed under the display when the display is viewed from above. The processor may be configured to correct an illuminance identified using data received from the second sensor, based on color information of an image to be displayed on the display.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A foldable mobile electronic device comprising:
   a first housing;
   a second housing;
   a hinge assembly rotatably connecting the first housing and the second housing;
   a flexible display disposed in such a way so as to extend from one area of the first housing to one area of the second housing across the hinge assembly;
   a first sensor to generate data used to identify an angle formed between the first housing and the second housing;
   a second sensor to generate data used to identify an ambient illuminance around the foldable mobile electronic device, and disposed in the second housing to face the first housing when the foldable mobile electronic device is in a folded state; and
   a processor connected to the flexible display, the first sensor, and the second sensor,
   wherein the processor is configured to:
      recognize, based on the data received from the first sensor, a change in a state of the foldable mobile electronic device from the folded state to a partially folded state before reaching an unfolded state,
      identify a first illuminance by using the data received from the second sensor, based on the recognized state change,
      set a brightness of the flexible display to a luminance corresponding to the first illuminance,
      adjust a brightness of the flexible display based on a second illuminance identified using the second sensor when an angle identified after the state change is smaller than a predetermined value, and
      maintain the brightness of the flexible display without change when an angle identified after the state change is larger than the predetermined value.

2. The foldable mobile electronic device of claim 1,
   wherein a second luminance corresponding to the second illuminance is identified based on a first lookup table, and
   wherein the second luminance is set as the brightness of the flexible display.

3. The foldable mobile electronic device of claim 1,
   wherein the processor is configured to, when a third illuminance identified using the second sensor after the state change falls within an illuminance range set based on the first illuminance, perform the maintaining of the brightness of the flexible display without change, and
   wherein the processor is further configured to, when the third illuminance is outside the illuminance range, identify a third luminance corresponding to the third illuminance in a second lookup table, and set the third luminance as the brightness of the flexible display.

4. The foldable mobile electronic device of claim 1, further comprising:
   a display driver,
   wherein the processor is further configured to transmit a flag to the display driver when an angle identified after the state change is smaller than the predetermined value or when a specific time has not elapsed after the state change, and
   wherein the display driver is configured to perform the adjusting of a brightness of the flexible display while the flag is received from the processor, and perform the maintaining of the brightness of the flexible display without change when receiving the flag from the processor is stopped.

5. The foldable mobile electronic device of claim 1,
   wherein the processor is further configured to maintain the brightness of the flexible display without change when an angle identified after the state change falls within a predetermined angle range and is maintained for a specific time, and
   wherein the maximum value in the predetermined angle range is smaller than the predetermined value.

6. The foldable mobile electronic device of claim 1,
   wherein the second sensor is disposed under the flexible display when the flexible display is viewed from above, and
   wherein the processor is further configured to identify an illuminance by using data received from the second sensor while the flexible display is turned off.

7. The foldable mobile electronic device of claim 6, wherein a cycle in which the second sensor is turned on and off is shorter than a cycle in which the flexible display is turned on and off.

8. The foldable mobile electronic device of claim 1,
   wherein the second sensor is disposed under the flexible display when the flexible display is viewed from above, and
   wherein the processor is further configured to correct an illuminance identified using data received from the second sensor, based on color information of an image to be displayed on the flexible display.

9. The foldable mobile electronic device of claim 8, wherein the color information includes color on pixel ratio (COPR) information.

10. The foldable mobile electronic device of claim 9,
    wherein the flexible display includes a display driver IC and a display panel, and
    wherein the display driver IC is configured to control the display panel to output image information in a frame unit, and to transmit COPR information of a frame to be output to the processor.

11. The foldable mobile electronic device of claim 1, wherein the first sensor includes an encoder sensor or a Hall sensor attached to the hinge assembly.

12. The foldable mobile electronic device of claim 1,
wherein the first sensor includes a first motion sensor disposed in the first housing and a second motion sensor disposed in the second housing, and
wherein the first motion sensor and the second motion sensor include at least one of an acceleration sensor or a gyro sensor.

13. The foldable mobile electronic device of claim 1, wherein the second sensor includes a red (R) channel for receiving red-based light, a green (G) channel for receiving green-based light, a blue (B) channel for receiving blue-based light, and a clear (C) channel for receiving white light.

14. A foldable electronic device comprising:
a first housing;
a second housing;
a hinge assembly rotatably connecting the first housing and the second housing;
a flexible display disposed in such a way so as to extend from one area of the first housing to one area of the second housing across the hinge assembly;
a first sensor to generate data used to identify an angle formed between the first housing and the second housing;
a second sensor to generate data used to identify an ambient illuminance around the foldable electronic device, and disposed in the second housing to face the first housing when the foldable electronic device is in a folded state; and
a processor connected to the flexible display, the first sensor, and the second sensor,
wherein the processor is configured to:
recognize, based on the data received from the first sensor, a change in a state of the foldable electronic device from the folded state to a partially folded state before reaching an unfolded state,
identify a first illuminance by using the data received from the second sensor, based on the recognized state change,
set a brightness of the flexible display to a luminance corresponding to the first illuminance,
while the foldable electronic device is changed from the folded state to the unfolded state, adjust a brightness of the flexible display based on a second illuminance identified using the second sensor, and
maintain the brightness of the flexible display without change when the angle identified after the state change falls within a predetermined angle range and is maintained for a specific time.

15. The foldable electronic device of claim 14,
wherein a second luminance corresponding to the second illuminance is identified based on a first lookup table, and
wherein the second luminance is set as the brightness of the flexible display.

16. The foldable electronic device of claim 14,
wherein the processor is configured to perform a hysteresis adjustment operation to, when a third illuminance identified using the second sensor after the state change falls within an illuminance range set based on the first illuminance, perform the maintaining of the brightness of the flexible display without change, and
wherein the processor is further configured to, when the third illuminance is outside the illuminance range, identify a third luminance corresponding to the third illuminance in a second lookup table, and set the third luminance as the brightness of the flexible display.

17. The foldable electronic device of claim 14, further comprising:
a display driver,
wherein the processor is further configured to generate a flag while the foldable electronic device is changed from the folded state to the unfolded state, and stop generating the flag when an angle identified after the state change falls within the predetermined angle range and is maintained for the specific time, and
wherein the display driver is configured to perform the adjusting of a brightness of the flexible display while the flag is generated, and perform the maintaining of the brightness of the flexible display without change when generating the flag is stopped.

18. The foldable electronic device of claim 14,
wherein the second sensor is disposed under the flexible display when the flexible display is viewed from above, and
wherein the processor is further configured to identify an illuminance by using data received from the second sensor while the flexible display is turned off.

19. The foldable electronic device of claim 14,
wherein the second sensor is disposed under the flexible display when the flexible display is viewed from above, and
wherein the processor is further configured to correct an illuminance identified using data received from the second sensor, based on color information of an image to be displayed on the flexible display.

20. A foldable mobile electronic device comprising:
a first housing;
a second housing;
a hinge assembly rotatably connecting the first housing and the second housing;
a flexible display disposed in such a way so as to extend from one area of the first housing to one area of the second housing across the hinge assembly;
a first sensor to generate data used to identify an angle formed between the first housing and the second housing;
a second sensor to generate data used to identify an ambient illuminance around the foldable mobile electronic device, and disposed in the second housing to face the first housing when the foldable mobile electronic device is in a folded state; and
a processor connected to the flexible display, the first sensor, and the second sensor,
wherein the processor is configured to:
recognize, based on the data received from the first sensor, a change in a state of the foldable mobile electronic device from the folded state to a partially folded state before reaching an unfolded state,
identify a first illuminance by using the data received from the second sensor, based on the recognized state change,
set a brightness of the flexible display to a luminance corresponding to the first illuminance,
adjust a brightness of the flexible display based on a second illuminance identified using the second sensor when a specific time has not elapsed after the state change, and
maintain the brightness of the flexible display without change when the specific time has elapsed after the state change.

* * * * *